United States Patent [19]

Ogata et al.

[11] Patent Number: 4,898,065
[45] Date of Patent: Feb. 6, 1990

[54] PLANETARY REDUCTION GEAR

[75] Inventors: Seishiro Ogata; Katsumi Taki, both of Ohbu, Japan

[73] Assignee: Sumitomo Heavy Industries, Ltd., Tokyo, Japan

[21] Appl. No.: 305,122

[22] PCT Filed: Feb. 26, 1988

[86] PCT No.: PCT/JP88/00210

§ 371 Date: Oct. 26, 1988

§ 102(e) Date: Oct. 26, 1988

[87] PCT Pub. No.: WO88/06688

PCT Pub. Date: Sep. 7, 1988

[30] Foreign Application Priority Data

| Feb. 27, 1987 | [JP] | Japan | 62-46182 |
| Feb. 27, 1987 | [JP] | Japan | 62-46183 |
| Apr. 24, 1987 | [JP] | Japan | 62-99873 |
| Apr. 27, 1987 | [JP] | Japan | 62-62581 |
| Apr. 27, 1987 | [JP] | Japan | 62-62582 |

[51] Int. Cl.⁴ ............................. F16H 1/28
[52] U.S. Cl. .................... 475/179; 475/178; 475/162
[58] Field of Search .............. 74/804, 805, 801; 901/25

[56] References Cited

U.S. PATENT DOCUMENTS

| 1,673,838 | 6/1928 | MacKenzie | 74/805 |
| 3,129,611 | 4/1964 | Lee | 74/804 |
| 3,602,070 | 8/1971 | Verge et al. | 74/804 |
| 3,874,253 | 4/1975 | Waddington | 74/804 |
| 4,010,653 | 3/1977 | Mekjian | 74/805 X |
| 4,407,170 | 10/1983 | Fukui | 74/804 X |
| 4,656,891 | 4/1987 | Durand | 74/804 |
| 4,690,010 | 9/1987 | Matsumoto et al. | 74/804 X |

FOREIGN PATENT DOCUMENTS

| 2400590 | 7/1974 | Fed. Rep. of Germany | 74/804 |
| 39-25398 | 11/1964 | Japan . | |
| 40-17325 | 8/1965 | Japan . | |
| 49-24260 | 6/1974 | Japan . | |
| 56-70244 | 6/1981 | Japan . | |
| 927684 | 6/1963 | United Kingdom | 74/804 |

Primary Examiner—Dwight G. Diehl
Assistant Examiner—Christopher Campbell
Attorney, Agent, or Firm—Armstrong, Nikaido, Marmelstein, Kubovcik & Murray

[57] ABSTRACT

A planetary reduction gear has an inscribe type planetary gear mechanism (100; 600) and a planetary gear mechanism (130; 630) combined therewith. The inscribed type planetary gear mechanism has an internally-toothed gear (108; 602) and a flange (115; 608) either one of which serves as an output member while the other serves as a stationary member. Rotation of the input shaft (131; 631) of the planetary gear mechanism is transmitted to a planet carrier through an externally-toothed sun gear (132; 635) and planet gears (133; 636) so as to rotate the planet carrier in the same direction as the direction of rotation of the input shaft. The rotation of the planet carrier is transmitted to the output member through at least one eccentric member (102a, 102b; 61a, 613b) and at leat one externally-toothed gear (103a, 103b; 601b) in the inscribe type planetary gear mechanism so that the output member is rotated in the direction counter to the direction of rotation of the planet carrier. The transmission of the rotation from the externally-toothed sun gear to the planet gears is conducted through a closed loop such that the rotation is transmitted from the planet gears back to these planet gears through the planet carrier, eccentric member, externally-toothed gear, output member and an internally-toothed sun gear (138; 640).

12 Claims, 24 Drawing Sheets

PLANETARY REDUCTION GEAR

DESCRIPTION

1. Industrial Field

The present invention relates to a planetary reduction gear having an inscribe type planetary gear mechanism.

2. Background Art

Reduction gears generally referred to as "harmonic drives" are broadly used as control reduction gears in driving systems of, for example, robots. This type of reduction gear has a flexible, thin-walled and externally-toothed ring, and a pair of opposing internally-toothed gears one of which is fixed while the other is rotatable. The ring is pressed onto the internally-toothed gears by means of a web generator so as to cause the rotatable gear to rotate by an amount which corresponds to the difference in the number of teeth between these internally-toothed gears. Unfortunately, the rigidity of this type of reduction gear is not so high because the speed reducing portion includes a flexible thin-walled part, though the size and weight are advantageously reduced. For these reasons, the harmonic drive reduction gears cannot be used satisfactorily as control reduction gears in driving systems which transmit large driving power and which are required to have large rigidity.

A planetary reduction gear, generally referred to as "cyclo reduction gear" (registered trademark) and having an inscribe type planetary gear mechanism is well known as having high level of rigidity and comparatively large reduction ratio. The cyclo reduction gear has an internally-toothed gear and at least one externally-toothed gear which is inscribed in the internally-toothed gear. The internally-toothed gear has teeth of an arcuate tooth form provided by pins or a combination pins and rollers, while the externally-toothed gear has epitrochoidal tooth shape following epitrochoidal parallel curve. The externally-toothed gear is provided with a plurality of pin-receiving holes which are spaced in the circumferential direction and which loosely receive respective inner pins. When at least one eccentric member fitting in the externally-toothed gear rotates, the externally-toothed gear is rotated in an orbiting manner so that the input torque is output at a reduced speed. This cyclo reduction gear can transmit a large torque and, in addition, provides a large reduction ratio, so that it is used in a variety of fields.

An example of the known "cyclo reduction gear" will be explained with reference to the drawings, particularly to FIGS. 1 and 2.

The reduction gear has an input shaft 1 onto which is keyed by a key 3 a hollow eccentric shaft 2 for rotation together with the input shaft 1. The eccentric shaft 2 has a pair of eccentric portions 4a and 4b which are arranged in a side-by-side fashion in the direction of axis of the shaft 2. Annular externally-toothed gears 6a and 6b are rotatably mounted on the respective eccentric portions 4a and 4b through rollers 5. The gears 6a and 6b are provided on the outer peripheral surfaces thereof with external teeth 7 having an epitrochoidal tooth form. An internally-toothed ring gear 8 is arranged such that the externally-toothed gears 6a, 6b are inscribed in this gear 8 has arcuate teeth provided with a plurality of outer pins 9 which are fixed to the inner peripheral surface thereof. These outer pins 9 mesh with the external teeth of the externally-toothed gears 6a and 6b. Outer rollers may be loosely fitted to the outer pins 9.

Each of the externally-toothed gears 6a and 6b are provided with a plurality of, e.g., 8, pin-receiving bores 10. The pin-receiving bores 10 in the externally-toothed gear 6a and those 10 of the externally-toothed gear 6b are axially aligned. The axially aligned pin-receiving bores 10 loosely receive inner pins 11 each of which rotatably carries an inner roller 12. The inner pin 11 is held by an output flange 13 which is integrally connected to an output shaft 14.

The internally-toothed gear 8 is clamped at its both sides by stationary covers 15 and 16 and are fixed to these covers 15 and 16 by means of a plurality of bolt-and-nut assemblies 17. The output shaft 14 is rotatably supported by a pair of bearings 18 and 19 which are axially spaced from each other and which are disposed between the output shaft 14 and the stationary cover 16. On the other hand, the input shaft 1 is supported by a pair of bearings 21 and 22 which are axially spaced from each other. One 22 of the pair of bearings is disposed between the input shaft 1 and the output flange 13, while the other 21 is disposed between the input shaft 1 and the stationary cover 15.

When the planetary reduction gear explained in connection with FIGS. 1 and 2 is incorporated in a control mechanism such as that used in a robot system, the precision of the control operation may be failed by a fluctuation in the rotation attributable to mechanical production error, transmission error or a resonance of the system. More specifically, any error incurred during production of the inner pin 11 or the inner pin-receiving bore 10 causes a variation in the load applied to the inner pin 11 which undesirably deforms the inner pin 11 resulting in an error in the transmission between the input shaft 1 and the output flange 13. In order to obviate this problem, it is necessary that the precision of the parts or elements of the reduction gear and the rigidity of the same are increased to considerably high levels. The undesirable fluctuation in the rotation in a planetary reduction gear can be suppressed by providing elastic dampers in various meshing portions of the reduction gear so as to absorb any error, as known from, for example, Japanese Utility Model Examined Publication No. 39-35083. Such an arrangement, however, can absorb vibration only when the vibration characteristic of the damper conforms with that of the whole gear mechanism. Thus, the vibration may be amplified due to resonance.

A system also is known in which, as is the case of ordinary servo control system, error information available at the output side of the planetary reduction gear is fed back to the input side. Ordinary servo control systems, however, are still unsatisfactory when used in planetary gear system because they cannot properly deal with any disturbance which may be input to the planetary reduction gear.

An inscribe type planetary reduction gear shown in FIGS. 3 and 4 also is known. This inscribe type planetary gear is similar to the "cyclo reduction gear" shown in FIGS. 1 and 2 but is different from the "cyclo reduction gear" in that the rotation of the input shaft 31 is transmitted to a plurality of eccentric crank pins 32 by which externally-toothed gears 33a and 33b are rotated in an orbiting manner. Nevertheless, the reduction gear of FIGS. 3 and 4 is basically the same as the "cyclo reduction gear" in that it is designed to cause orbiting rotary motion of the externally-toothed gears 33a and 33b having trochoidal teeth.

Referring to FIGS. 3 and 4, a pinion 35 is attached to an input shaft 31 for rotation as a unit therewith. The pinion 35 meshes with three pre-stage externally-toothed gears 36 which are equi-distantly spaced in the circumferetial direction. These pre-stage externally-toothed gears 36 are mounted on respective eccentric crankshafts 32 for rotation as a unit therewith. Each eccentric crankshaft 32 is rotatably supported by a carrier 37 and a stopper plate 38 through respective bearings 41 and 42. Each eccentric crankshaft 32 has a pair of eccentric portions 43a and 43b which are arranged in a side-by-side fashion in the axial direction. Each of the externally-toothed gears 33a and 33b has a plurality of, e.g., 3, bores 44 which are spaced in the circumferential direction. The bores 44 formed in one 33a of the externally-toothed gear 33a are axially aligned with the bores 44 in the other externally-toothed gear 33b. The plurality of pairs of aligned bores 44 rotatably receive the respective eccentric crankshafts 32. The externally-toothed gears 33a and 33b mesh with external pins 46 which are secured to the inner peripheral surface of an internally-toothed gear 45. The internally-toothed gear 45 is secured to a pair of stationary covers 47 and 48. The carrier 37 is extended through central openings 49 which are formed in the externally-toothed gears 33a and 33b. As the pinion 35 rotates, the rotation of the pinion 35 is transmitted to the eccentric portions 43a, 43b through the pre-stage externally-toothed gears 36 and the eccentric crankshafts 32 so as to cause the externally-toothed gears 33a and 33b to rotate in an orbiting manner. In consequence, the speed of rotation of the externally-toothed gears 33a, 33b meshing with the fixed externally-toothed gear 45 is reduced and transmitted to the carrier 37 through the eccentric crankshafts 32, and the rotation of the reduced speed is output through the carrier 37. In the reduction gear of the type shown in FIGS. 3 and 4, the number of teeth on each externally-toothed gear 33a, 33b is smaller by one than the number of the outer pins 46 secured to the inner peripheral surface of the internally-toothed gear 45. In consequence, the externally-toothed gears 33a, 33b are made to rotate about their axes with their speed reduced to the inverse of the number of teeth of the externally-toothed gear 33a, 33b (1/teeth number of gears 33a, 33b) and the revolution is transmitted to the carrier 37 through the eccentric crankshafts 32. Referring again to the "cyclo reduction gear" explained before in connection with FIGS. 1 and 2, the rotation of the input shaft 1 is transmitted to the output shaft 14 through the output flange 13 such that the output shaft 14 rotates by (1/teeth number of externally-toothed gears 6a, 6b) rotation per one rotation of the input shaft.

The inscribe type planetary reduction gears of the type shown in FIGS. 1, 2 and FIGS. 3, 4 have high levels of rigidity and suffers from reduced play and deviation so that they are suitably used in articulate mechanisms of robots in which a specifically high driving power and high control precision are required. Unfortunately, however, the planetary reduction gears of the type described are not "perfect rigid member" so that the number of external teeth actually meshing with the outer pins, i.e., the effective meshing teeth number, is smaller than the total number of teeth, though theoretically all the teeth are engageable with the outer pins. Therefore, the known planetary reduction gear in which the difference in the number of teeth is one can transmit only a limited torque. In order to increase the torque transmission capacity beyond this limit, it is necessary that the size of the planetary reduction gear be increased. This goes quite contrary to the reduced size and weight which are substantial demands in the devices such as a robot driving mechanism.

An object of the present invention is to a provide a planetary reduction gear incorporating an inscribe type planetary gear mechanism in which the transmission mechanism itself has a mechanical feedback function so as to absorb fluctuation in the rotation.

Another object of the present invention is to provide a planetary reduction gear which suits to the use for controlling purpose and which can improve the rigidity of an inscribe type planetary gear mechanism while reducing size and weight.

DISCLOSURE OF THE INVENTION

According to the present invention, there is provided a planetary reduction gear having an inscribe type planetary gear mechanism comprising a ring-shaped internally-toothed gear, externally-toothed gear means which inscribe in the internally-toothed gear, a plurality of pin-receiving bores provided in the externally-toothed gear means and spaced in the circumferential direction, inner pins loosely received in the pin-receiving bores, a flange supporting the inner pins, and rotatable eccentric means for causing eccentric rotation of the externally-toothed gear means in an orbiting manner, characterized by comprising a planetary gear mechanism combined with the inscribe type planetary gear mechanism, the planetary gear mechanism including an input shaft, an externally-toothed sun gear secured to the input shaft for rotation therewith, a plurality of planet gears arranged around the sun gear in meshing engagement therewith, an internally-toothed sun gear in which the planet gears inscribe, and a rotatable planet carrier rotatably carrying the planet gears and connected to the eccentric means so as to rotate the eccentric means; wherein one of the internally-toothed gear and the flange serving as an output member while the other serve as a stationary member; and wherein the internally-toothed sun gear being secured to the output member for rotation therewith; whereby the rotation of the input shaft is transmitted to the planet carrier through the externally-toothed sun gear and the planet gears so as to cause the planet carrier to rotate in the same direction as the direction of rotation of the input shaft; and the rotation of the planet carrier is transmitted to the output member through the eccentric means and the externally-toothed gear means so as to cause the output member to rotate in the direction counter to the direction of rotation of the planet carrier.

Preferably, the difference between the number of teeth of the internally-toothed gear and that of the externally-toothed gear of the inscribe type planetary gear mechanism is not smaller than 2.

The Best Mode for Carrying Out the Invention

Embodiments of the present invention will be described with reference to FIGS. 5 to 18, as well as to FIG. 22.

Figure 1:
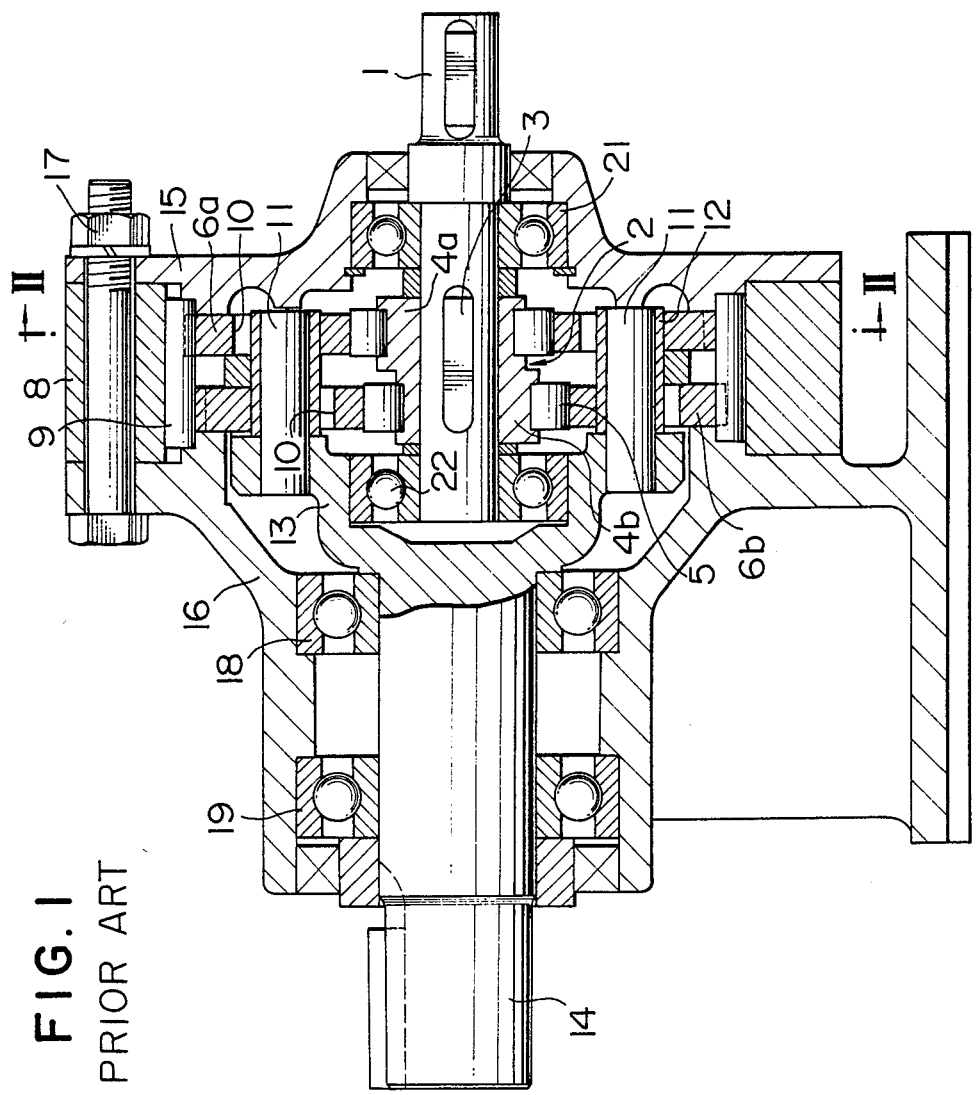
FIG. 1 is a longitudinal sectional view of a planetary gear system having a known inscribe type planetary gear mechanism.
Figure 2:
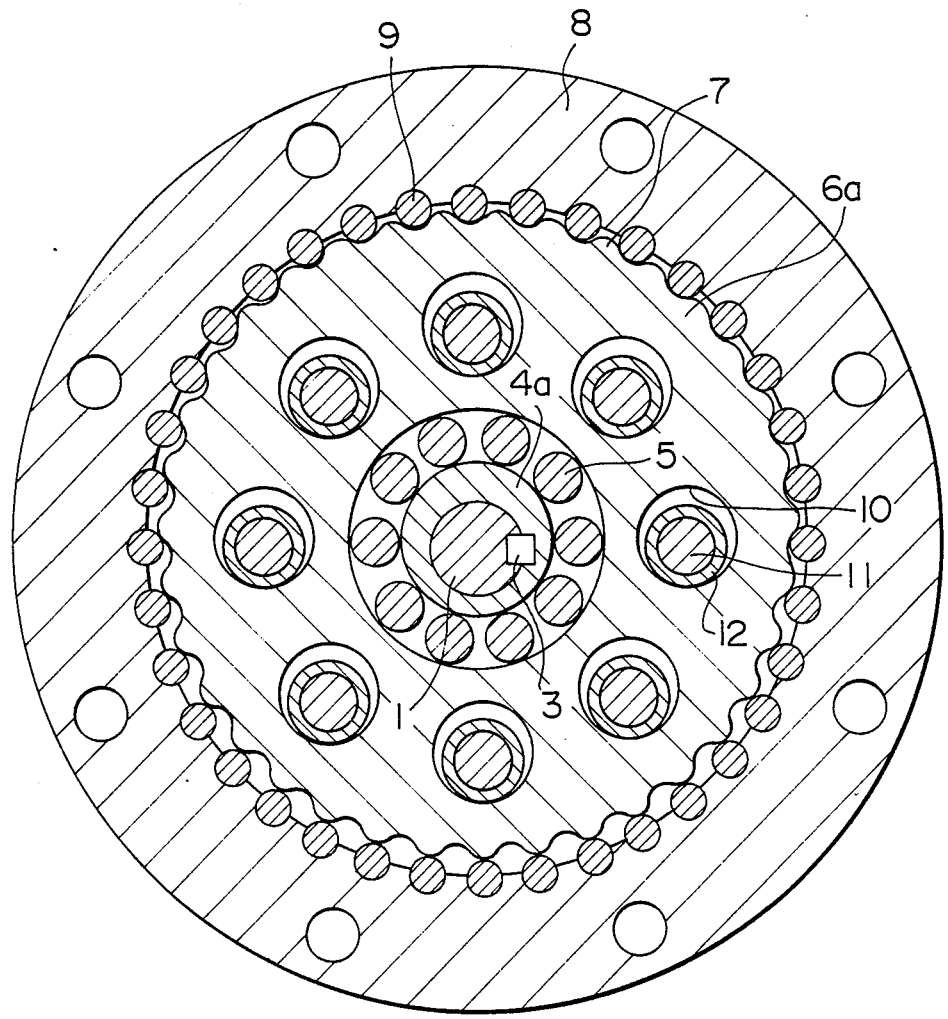
FIG. 2 is a sectional view taken along the line II—II of FIG. 1.

FIGS. 5 through 8 show a first embodiment of the planetary reduction gear in accordance with the present invention. The planetary reduction gear has an inscribed type planetary gear mechanism which is generally denoted by a numeral 100. The planetary gear mechanism 100 has a hollow intermediate input shaft 101. The intermediate input shaft 101 has a pair of eccentric portions 102a and 102b which are arranged side-by-side in the axial direction. A pair of annular externally-toothed gears 103a and 103b are rotatably carried by the eccentric portions 102a and 102b through a bearing ring 104 and rollers 105. Each of the externally-toothed gears 103a and 103b has external gear teeth of trochoidal tooth form. A ring-shaped internally-toothed gear 108 serving as a stationary member is disposed such that the externally-toothed gears inscribe in the internally-toothed gear 108. More specifically, the internally-toothed gear 108 is provided in the inner peripheral surface thereof with a plurality of grooves 109 which are equi-distantly spaced in the circumferential direction. These grooves 109 receive outer pins 111 rotatably or fixedly. The outer pin 111 defines an arcuate tooth form of the internally-toothed gear 108 for meshing engagement with the external teeth 107 of the externally-toothed gears 103a, 103b. These outer pins 111 may rotatably carry outer rollers. Each of the externally-toothed gears 103a and 103b is provided with a plurality of, e.g., 8, pin-receiving bores 112 which are spaced in the circumferential directions. The pin-receiving bores 112 in the externally-toothed gear 103a and those 112 in the externally-toothed gear 103b are axially aligned. The pairs of axially-aligned pin-receiving bores 112 loosely receive inner pins 113 which rotatably carry inner rollers 114. The inner pins 113 are held by an output flange 115 which serves as an output member. An output shaft (not shown) similar to the output shaft 14 in FIG. 1 is formed integrally with the output flange 115 or connected to the output flange 115. The internally-toothed gear 108 is clamped at its both sides by stationary covers 117 and 118 and are fixed to these covers by means of a plurality of bolt-and-nut assemblies. The intermediate input shaft 101 is rotatably supported by a pair of bearings 121 and 122 which are axially spaced from each other. One 122 of the bearings is disposed between the intermediate input shaft 101 and the output flange 115, while the other 121 is disposed between the intermediate input shaft 101 and the stationary cover 117. The inscribe type planetary gear mechanism 100 described above is the same as that in the known trochoidal type planetary reduction gear. In the first embodiment of the planetary reduction gear of the present invention, a planetary gear mechanism generally denoted by 130 is combined with the inscribe type planetary gear mechanism 100.

The planetary gear mechanism 130 has an input shaft 131. The aforementioned intermediate input shaft 101 is rotatably mounted on the input shaft 131 concentrically therewith through a pair of axially spaced bearings 132 and 133. An externally-toothed sun gear 132 is attached to the end of the input shaft 131 for rotation as a unit with the input shaft 131. A plurality of, e.g., three, planet gears 133, which are equi-distantly spaced in the circumferential direction, are arranged around the externally-toothed sun gear 132 in meshing engagement therewith. Each planet gear 133 is rotatably carried by a planet gear shaft 135. The planet gear shafts 135 are fixed to a planet carrier 136. The planet carrier 136 is formed integrally with the intermediate input shaft 10 or connected to the intermediate input shaft 10 for rotation as a unit therewith. The planet gears 133 inscribes in an internally-toothed sun gear 138 which is rotatable as a unit with the output flange 115. A description will be made of the operation of the planet reduction gear of the first embodiment.

Figure 6:
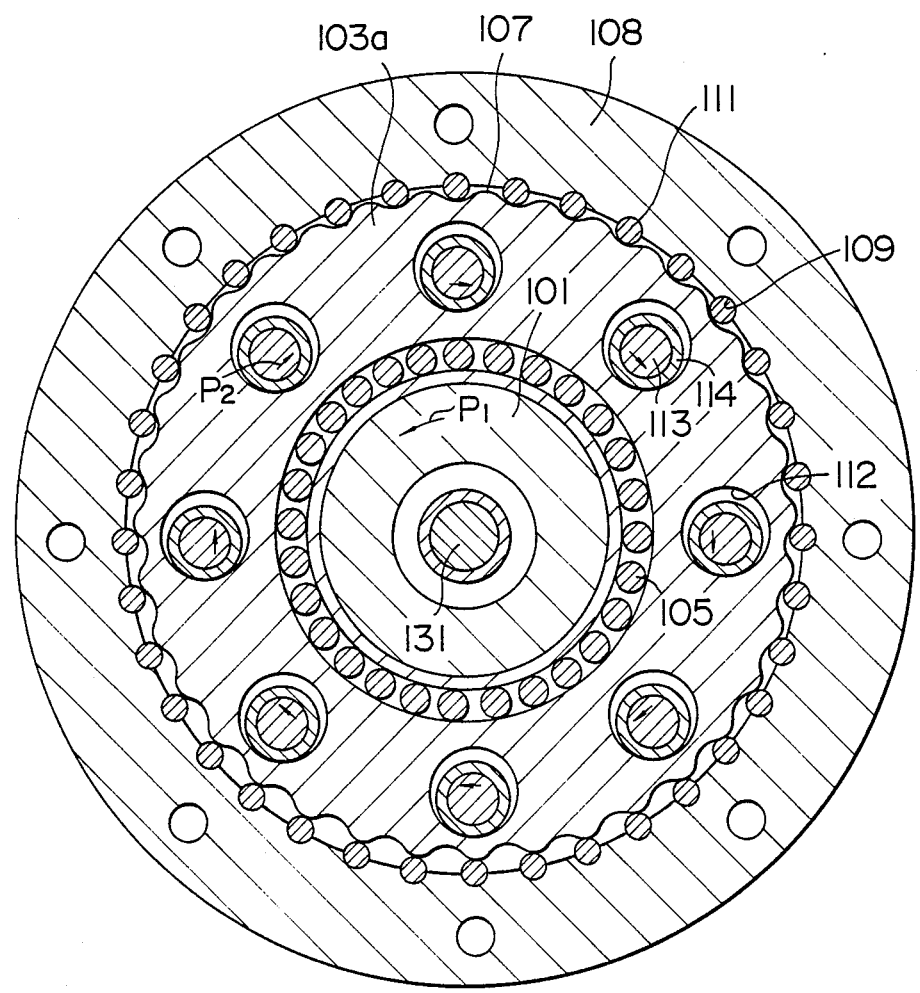
FIG. 6 is a sectional view taken along the line VI—VI of FIG. 5.

Referring to FIG. 6, rotation of the intermediate input shaft 101 in the direction of an arrow $P_1$ is transmitted to the output flange 115 which carries the inner pins 113, such that the output flange 115 rotates in the direction of an arrow $P_2$ at a reduced speed. Thus, the inscribe type planetary gear mechanism 100 operates such that the direction $P_1$ of rotation of the input member, i.e., the intermediate input shaft 101 is opposite to the direction P₂ of the output member, i.e., the output flange 115. More specifically, the rotation of the intermediate input shaft 101 to which the planet carrier 136 is fixed is transmitted to the output flange 115 through the eccentric portions 102a, 102b, externally-toothed gears 103a, 103b and the inner pins 115, so as to rotate the output flange 115 in the direction counter to the direction of rotation of the intermediate input shaft 101.

Figure 7:
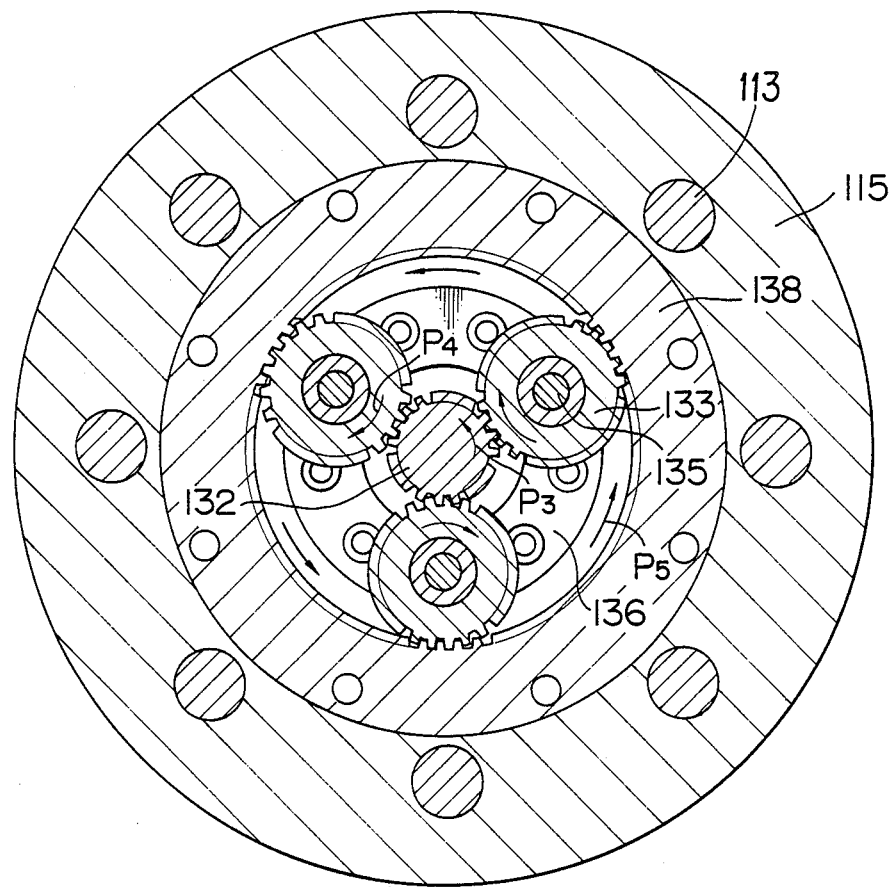
FIG. 7 is a sectional view taken along the line VII—VII of FIG. 5.

Referring now to FIG. 7, the direction of rotation of the externally-toothed sun gear 132 represented by an arrow P₃ causes the planet gears 133 to rotate in the direction of an arrow P₄ so that the planet carrier 136 fixed to the intermediate input shaft 101 rotates in the direction of an arrow P₅. Thus, in the planetary gear mechanism 130, the direction P₃ of rotation of the input shaft 131 as the input member and the direction P₅ of rotation of the planet carrier 136 as the output member are the same. More specifically, the rotation of the input shaft 131 is transmitted to the planet carrier 136 through the externally-toothed sun gear 132 and the planet gears 133 so as to rotate the planet carrier 136 in the same direction as the direction of rotation of the input shaft 131.

Figure 8:
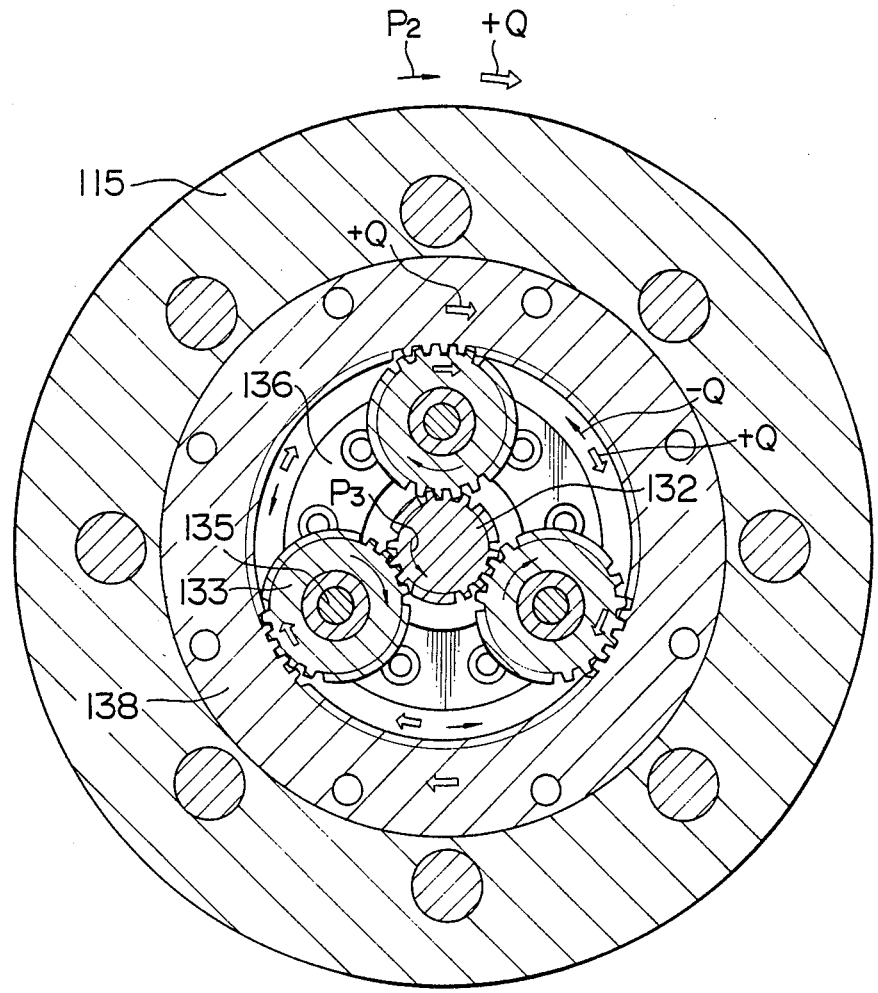
FIG. 8 is a sectional view explanatory of a mechanical feedback function of the planetary gear mechanism shown in FIG. 5.

It is assumed here that an error is caused in the amount of rotation of the output member, i.e., the output flange 115, for a given amount of rotation input. When the rotational phase of the output flange 115 is ahead of the correct phase by an amount +Q as shown in FIG. 8, the phase of the internally-toothed sun gear 138 which is connected to the output flange 115 also is set ahead by the same amount +Q. Since the planet carrier 136 rotates in the same direction as the direction of rotation of the internally-toothed sun gear 138 in the planetary gear mechanism 130, the intermediate input shaft 101 connected to the planet carrier 136 is pushed by an amount +Q in the same direction as the rotation of the output flange 115.

On the other hand, in the inscribe type planetary gear mechanism 100 shown in FIG. 6, the output member rotates in the direction counter to the direction of rotation of the input member, so that the intermediate input shaft 101 is rotated in the direction counter to the direction of rotation of the output flange 115, i.e., pushed by an amount −Q. Thus, the fluctuation of rotation of the output flange 115 causes the rotation of the intermediate input shaft 101 to be set aback by an amount −Q.

From the foregoing description, it will be understood that the transmission of rotation from the externally-toothed sun gear 132 to the planet gears 133 is conducted through a closed loop. Namely, the rotation of the planet gears 133 is transmitted back to the planet gears 133 through the planet carrier 136, intermediate input member 101, eccentric portions 102a, 102b, externally-toothed gears 103a, 103b, inner pin 113, output flange 115 and the internally-toothed sun gear 138.

In consequence, information is negatively fed back to the input side of the inscribe type planet gear mechanism 100 through the internally-toothed sun gear 138. This is equivalent to an electrical negative feedback in a servo system, namely, that the reduction gear has a function for cancelling any fluctuation +Q in the control object by −Q.

When the error of rotation of the output flange 115 appears in the direction for delaying the rotational phase of the output flange 115, such a phase delay is fed back in such a manner as to set the input side ahead by the same principle as that described above.

In the first embodiment of the planet reduction gear of the present invention, the fluctuation of rotation of the output flange 15 is fed back regardless of the cause of such fluctuation. The feedback function effectively compensates for not only transmission error produced in the reduction gear as a system but also for any error which may be caused by an impacting fluctuation of the error.

As has been described, the first embodiment of the present invention offers the following advantages. Namely, any transmission error and fluctuation of rotation can completely be absorbed by virtue of the mechanical feedback function incorporated in the reduction gear. In addition, fluctuation of rotation attributable to resonance of the mechanism to which the reduction gear is connected can be suppressed or eliminated by the feedback function of the reduction gear.

Figure 9:
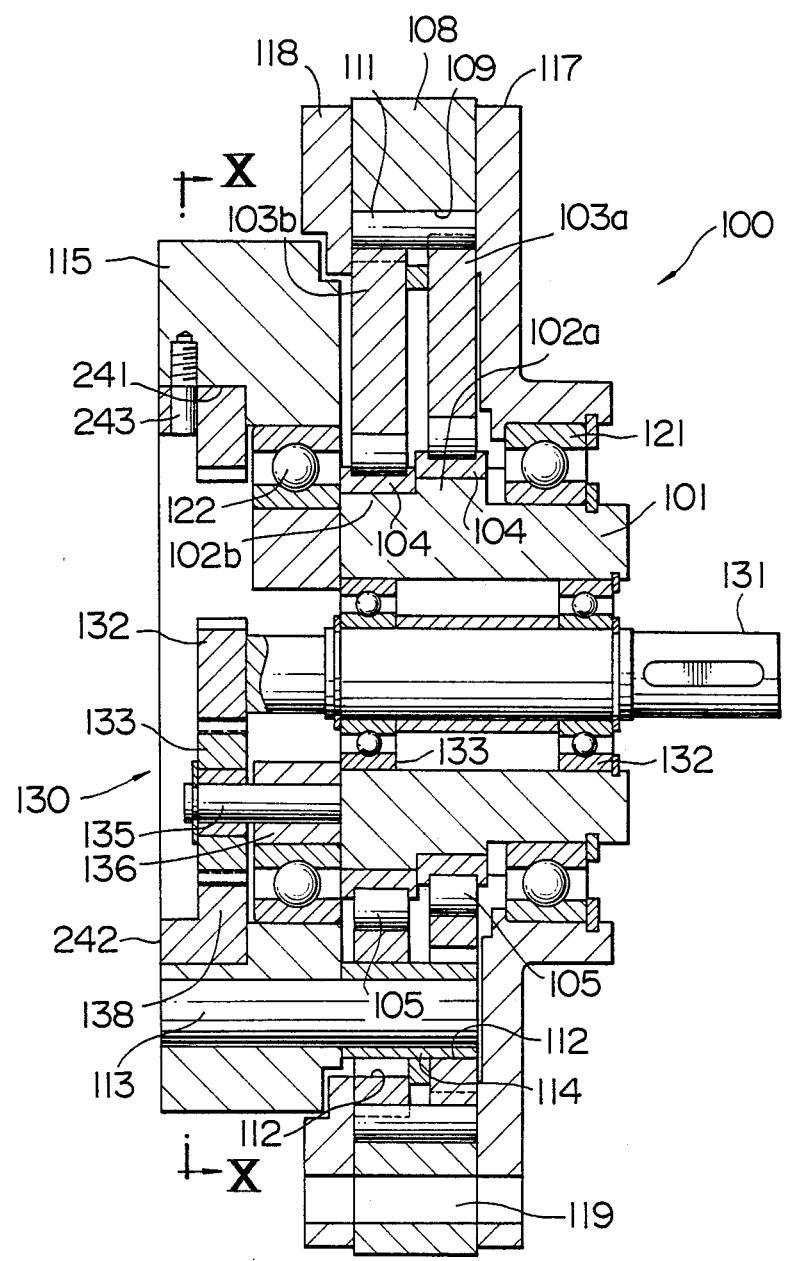
FIG. 9 is a longitudinal sectional view of a second embodiment of the planetary reduction gear in accordance with the present invention.
Figure 10:
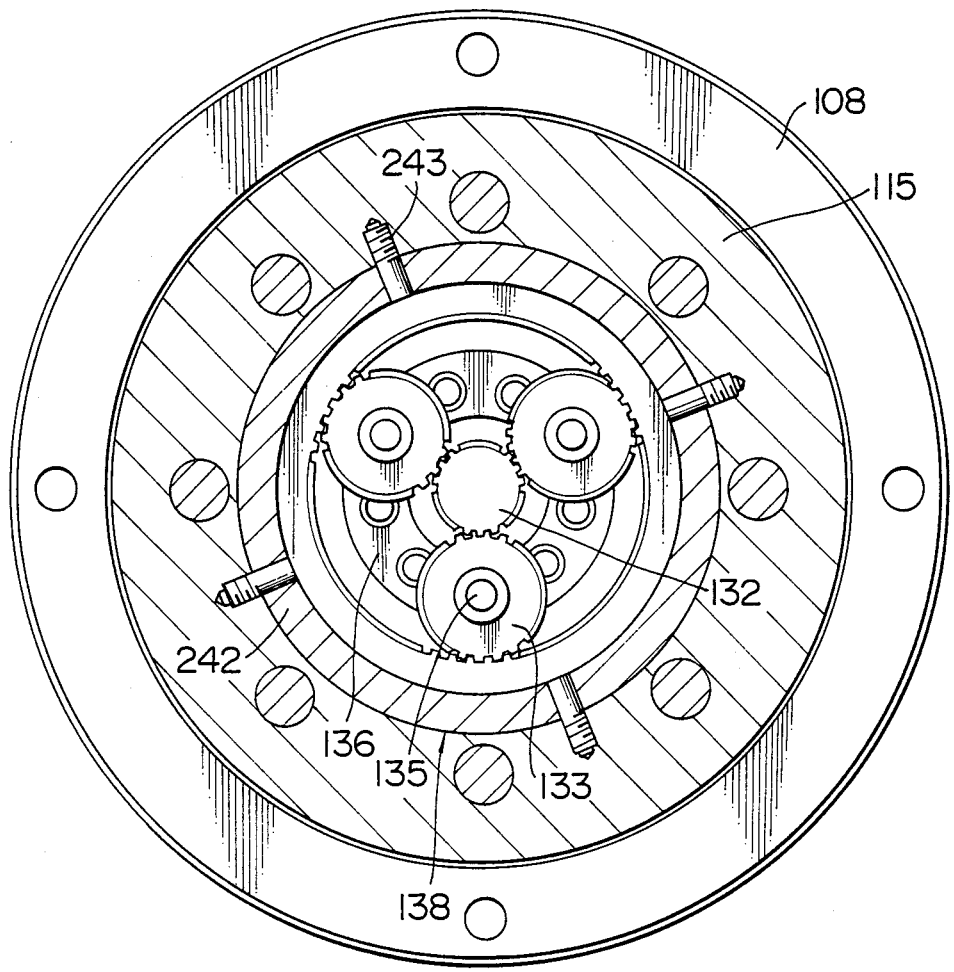
FIG. 10 is a sectional view taken along the line X—X of FIG. 9.

FIGS. 9 and 10 show a second embodiment of the planetary reduction gear of the present invention. In FIGS. 9 and 10, the same reference numerals are used to denote the same or similar parts or members to those used in the first embodiment explained in connection with FIGS. 5 to 8 and description of such same or similar parts is omitted.

The second embodiment shown in FIGS. 9 and 10 is different from the first embodiment in the following respects. An annular recess 241 is formed in the end surface of the output flange 115 and the internally-toothed sun gear 138 is received in the recess 241. The output flange 115 and the internally-toothed sun gear 138 are connected to each other through a fixing means. More specifically, the internally-toothed sun gear 138 is provided with an annular projection 242 integrally projecting from outer peripheral portion of the end surface thereof. The fixing means includes a plurality of stopper screws 243 which are screwed into the peripheral wall of the recess 241 through the annular projection 242 of the internally-toothed sun gear 138, whereby the internally-toothed sun gear 138 is fixed in the recess 241 in the output flange 115.

Figure 11:
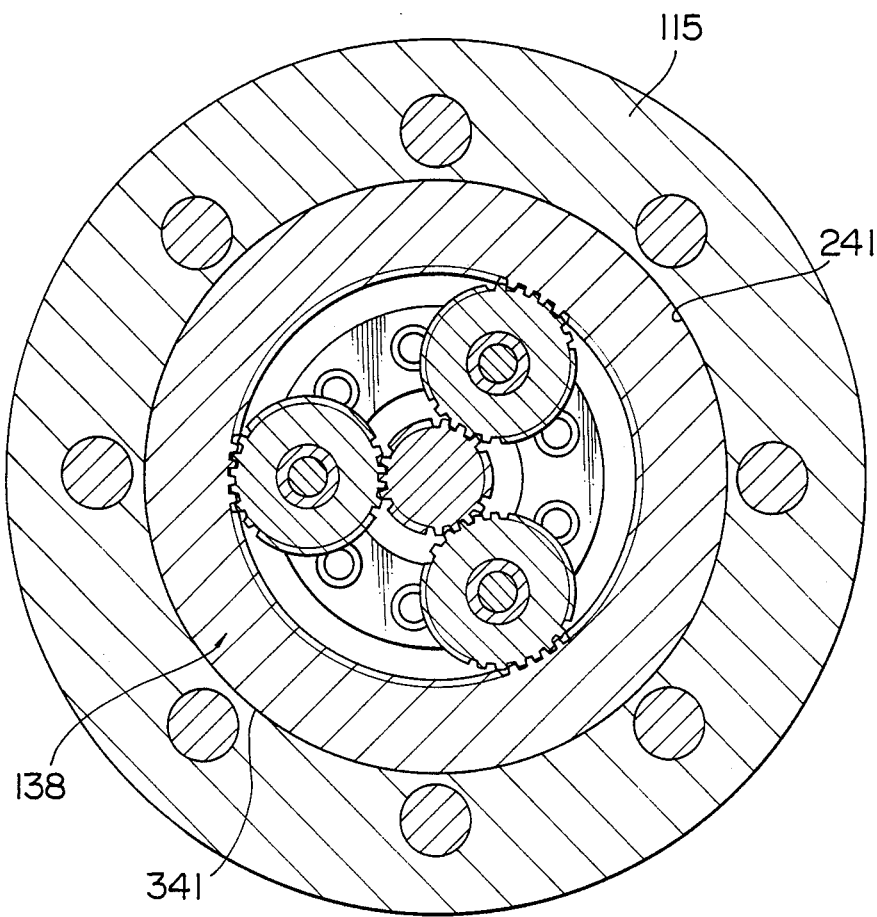
FIG. 11 is a view similar to that in FIG. 10, illustrating a third embodiment of the present invention.
Figure 12:
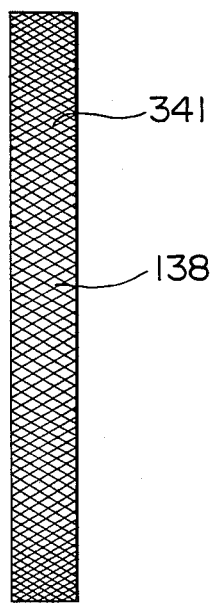
FIG. 12 is a side elevational view of an internally-toothed sun gear in the embodiment shown in FIG. 11.

FIGS. 11 and 12 show a third embodiment of the present invention. The third embodiment is materially the same as the second embodiment shown in FIGS. 9 and 10 except for the construction of the fixing means. Therefore, the same reference numerals are used to denote the same or similar parts as those in FIG. 10 and detailed description of such parts is omitted.

As in the case of the second embodiment, an annular recess 241 is formed in the end surface of the output flange 115 and the internally-toothed sun gear 138 is received in the recess 241. The output flange and the internally-toothed sun gear 138 are connected to each other by means of the fixing means. The fixing means is presented by knurled portion in the outer peripheral surface of the internally-toothed sun gear 138. The internally-toothed sun gear 138 is press-fit in the recess 241 such that the knurled portion 341 frictionally engages with the peripheral wall surface of the recess 241 formed in the output flange 115, whereby the internally-toothed sun gear 138 is fixed in the recess 241 in the output flange 115. The third embodiment eliminates the necessity for fixing parts such as bolts and, at the same time, simplifies the assembly as well as management of the parts.

Figure 13:
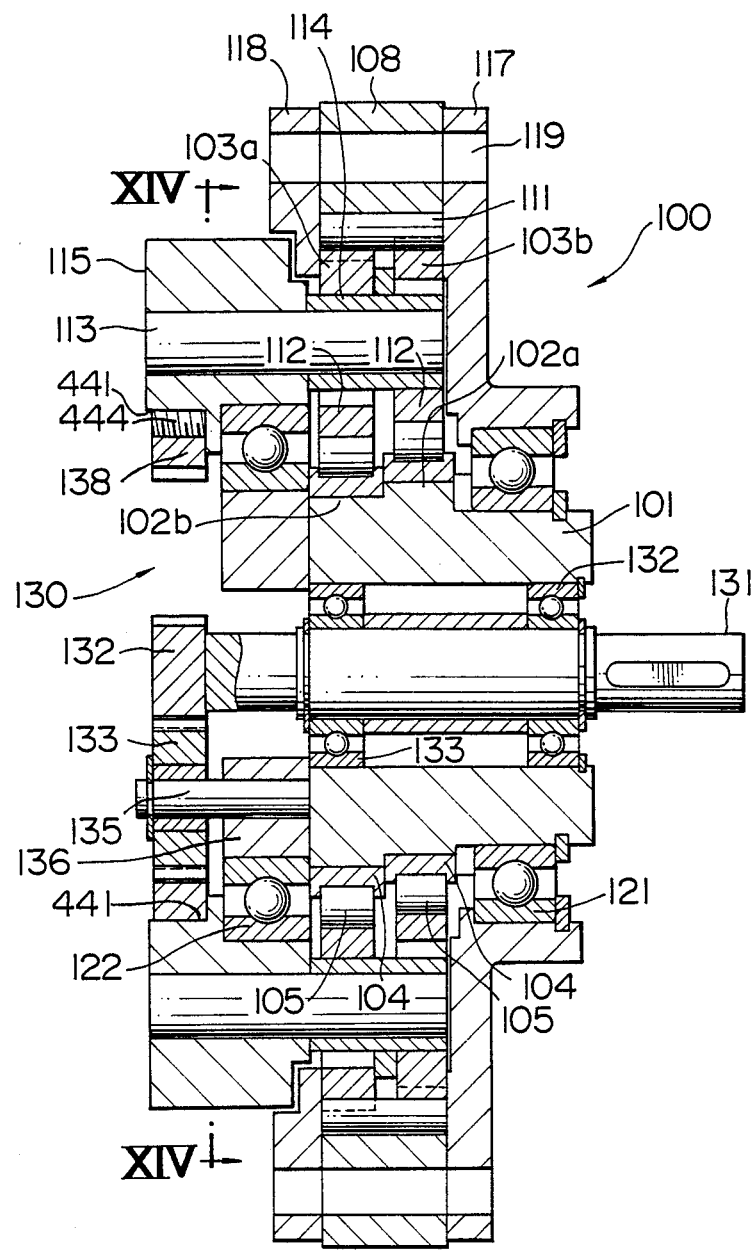
FIG. 13 is a longitudinal sectional view of a fourth embodiment of the planetary reduction gear of the present invention.
Figure 14:
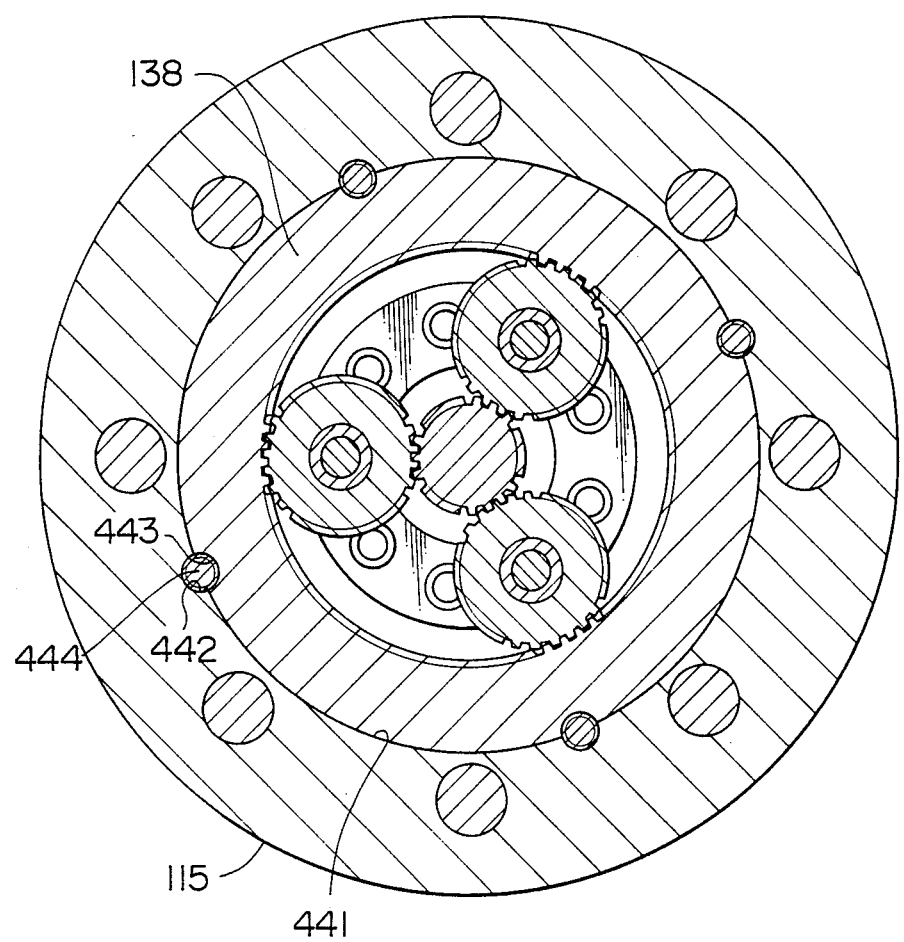
FIG. 14 is a sectional view taken along the line CIV–XIV of FIG. 13.

FIGS. 13 and 14 show a planetary reduction gear according to a fourth embodiment of the present invention. In these Figures, parts and members similar to those in the first embodiment explained in connection with FIGS. 5 to 8 are denoted by the same reference numerals and description of such parts is omitted.

The fourth embodiment shown in FIGS. 13 and 14 is different from the first embodiment in the following respects. The output flange 115 has an annular recess 441 and the internally-toothed sun gear 138 is fittingly received in the recess 441. The output flange 115 and the internally-toothed sun gear 138 are connected to each other by fixing means. A plurality of axial grooves 442, each having a semi-circular cross-section, are formed in the peripheral surface of the recess 441 formed in the flange 115 at a regular interval in the circumferential direction. On the other hand, the internally-toothed sun gear 138 is provided in the outer peripheral surface thereof with a plurality of axial grooves 443 each having a semi-circular cross-section, at a predetermined circumferential pitch. The axial grooves 442 formed in the peripheral surface of the recess 441 and the axial grooves 443 formed in the outer peripheral surface of the internally-toothed sun gear 138 cooperate in defining a plurality of split circular holes. The fixing means is constituted by a plurality of screws 444 which are screwed into these split holes. The internally-toothed sun gear 138 is thus fixed in the recess 441 formed in the output flange 115.

Figure 15:
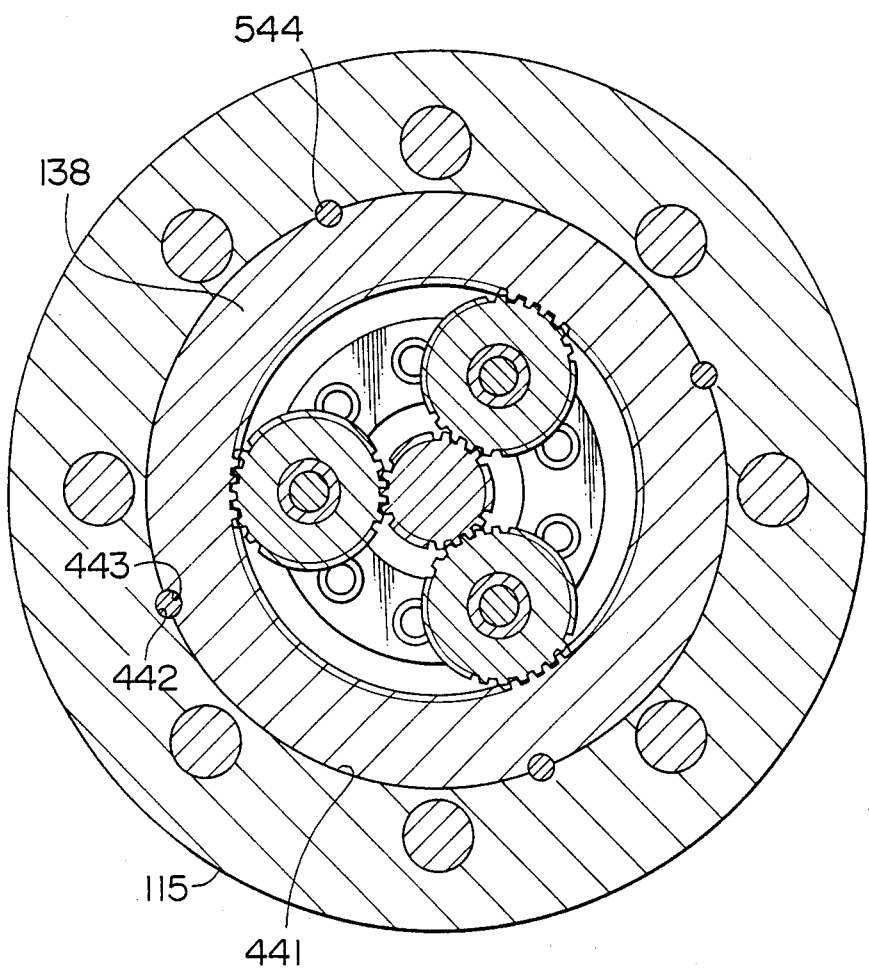
FIG. 15 is a view similar to that in FIG. 14 but showing a fifth embodiment of the present invention.

FIG. 15 shows a fifth embodiment of the present invention. The fifth embodiment is materially the same as the fourth embodiment except for the construction of the fixing means. Therefore, the same reference numerals are used to denote the same or similar parts to those appearing in FIG. 14 and detailed description of such parts is omitted. In the fifth embodiment, the fixing means includes a plurality of cotter pins 544 driven into the split bores. The internally-toothed sun gear 138 is fixed in the recess 441 of the output flange 115 by means of the cotter pins 544.

The second to fifth embodiments as described provide the following advantage over the first embodiment. Namely, the lengthwise dimension of the reduction gear is reduced to make the whole reduction gear compact by virtue of the fact that the planetary gear mechanism is incorporated within the axial length of the inscribe type planetary gear mechanism. This feature is advantageous particularly when the reduction gear is used in a robot control system.

Figure 16:
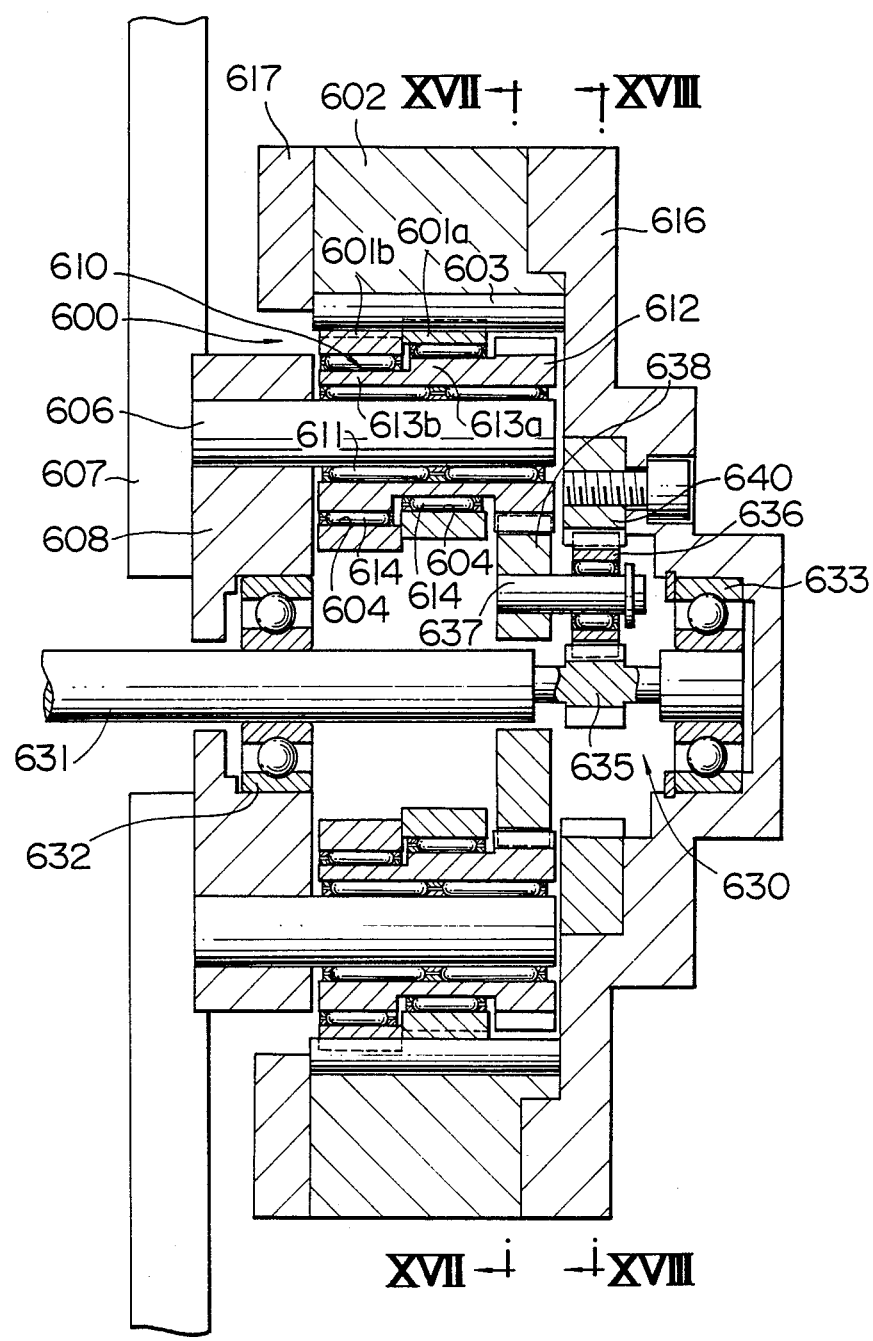
FIG. 16 is a longitudinal sectional view of a sixth embodiment of the planetary reduction gear of the present invention.
Figure 17:
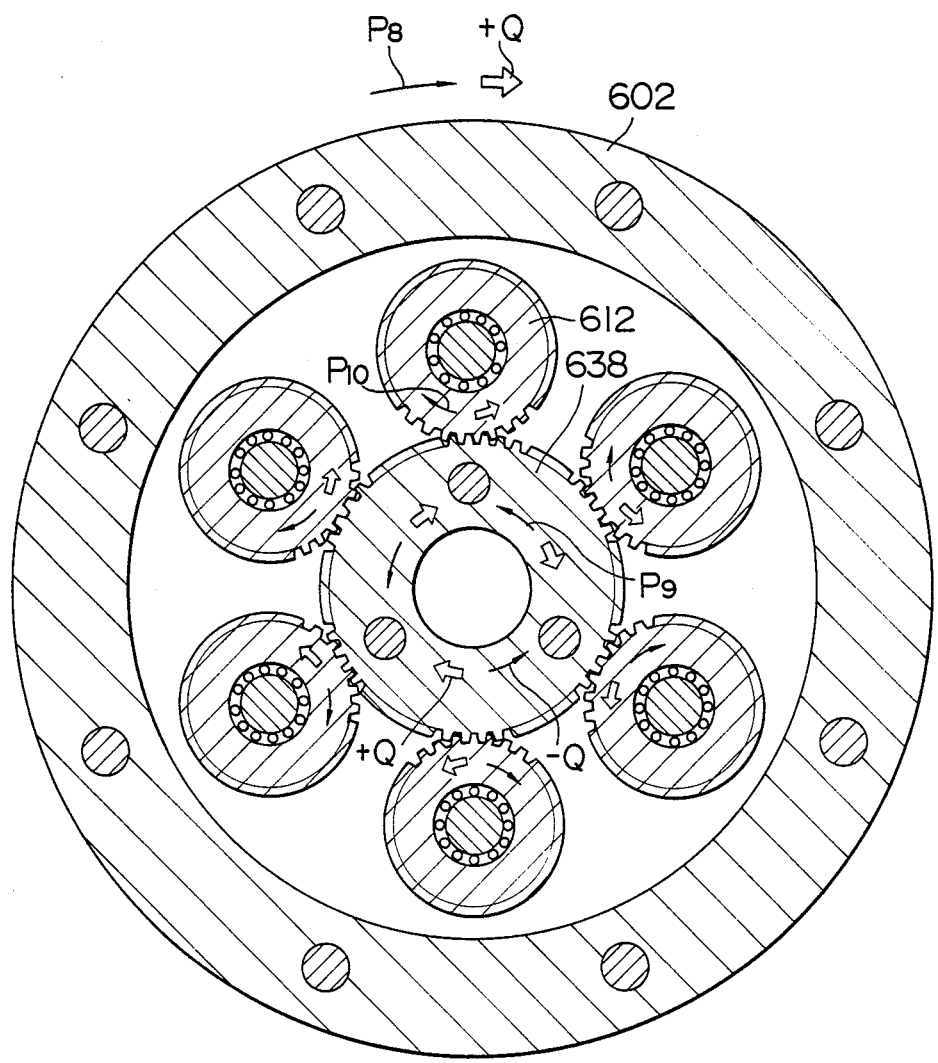
FIG. 17 is a sectional view taken along the line XVII—XVII of FIG. 16.
Figure 18:
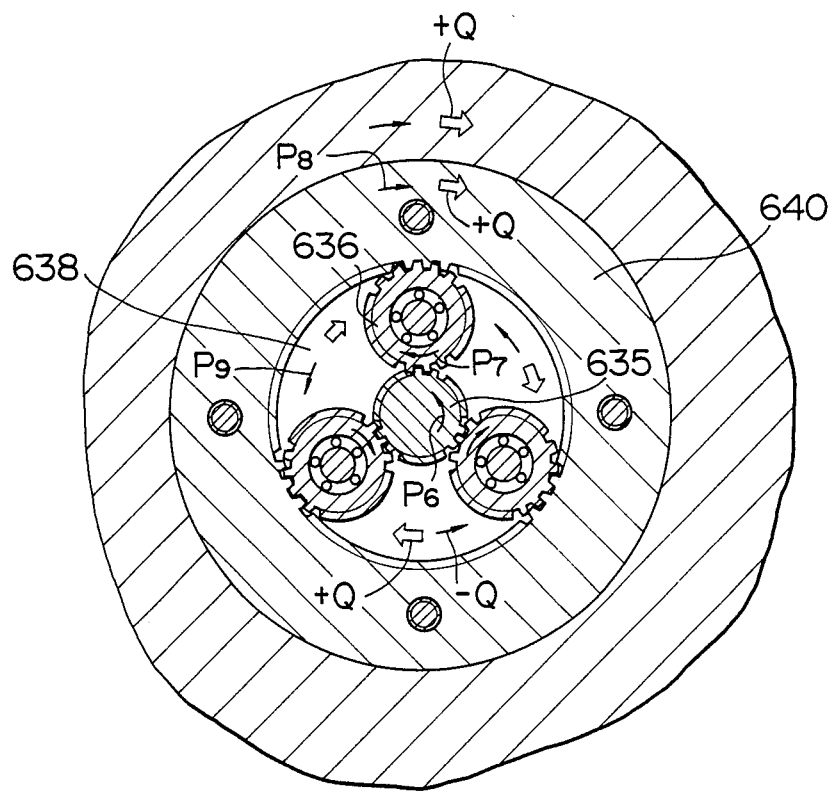
FIG. 18 is a sectional view taken along the line XVIII—VXIII FIG. 16.

FIGS. 16 to 18 show a sixth embodiment of the planetary reduction gear in accordance with the present invention. This planetary reduction gear has an inscribe planetary gear mechanism which is generally denoted by reference numeral 600. The planetary gear mechanism 600 has a pair of annular externally-toothed gears 601a and 601b which are arranged side-by-side in the axial direction. Each of the gears 601a and 601b has trochoidal external teeth which inscribe an internally-toothed gear 602 servable as the output member. Namely, as in the case of the first embodiment shown in FIG. 5, the inner peripheral surface of the internally-toothed gear 602 is provided with a plurality of grooves which are equi-distantly spaced in the circumferential direction. These grooves receive outer pins 603 rotatably or in a fixed manner. The outer pin 603 presents an arcuate tooth form of the internally-toothed gear 602 for engagement with the external teeth of the externally-toothed gears 601a, 601b. Outer rollers may be freely mounted on these outer pins 603. Each of the externally-toothed gears 601a and 601b is provided with a plurality of, e.g., six, pin-receiving bores 604 which are equi-distantly spaced in the circumferential direction.

Figure 5:
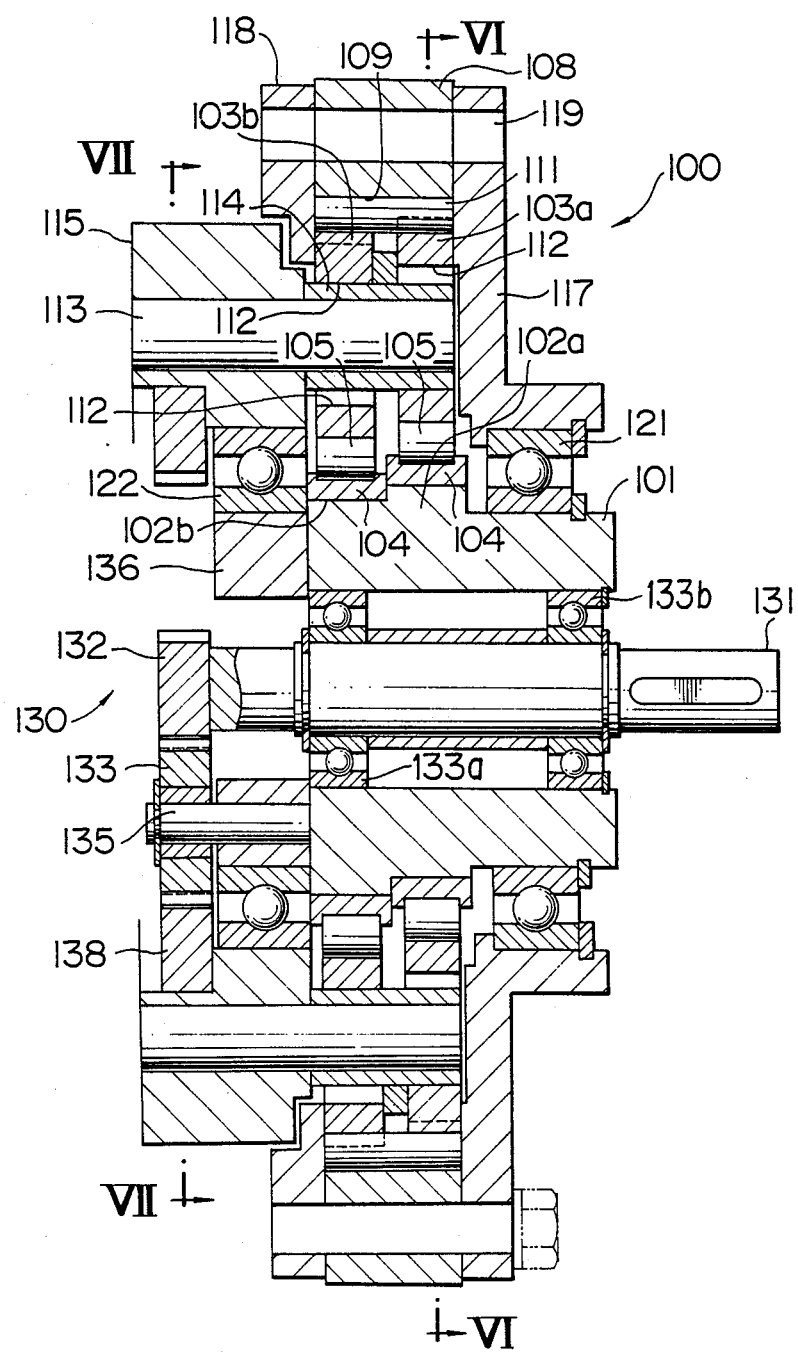
FIG. 5 is a longitudinal sectional view of a first embodiment of the planetary reduction gear in accordance with the present invention.

The pin-receiving bores 604 in the externally-toothed gear 601a and those 604 in the externally-toothed gear 601b are axially aligned and the pairs of axially aligned pin-receiving bores 604 receive respective inner pins 606. These inner pins 606 are carried by a stationary flange 608 which serves as a stationary member fixed to a stationary frame 607. The inner pin 606 rotatably carry eccentric cylindrical rollers 610 through intermediaries of bearings 611. A second externally-toothed gear 612 is integrally fixed to each eccentric roller 610. In the illustrated embodiment, the second externally-toothed gear 612 is provided on the right end of the eccentric cylindrical roller 610. This, however, is not exclusive and the second externally-toothed gear 612 may be disposed between the externally-toothed gears 601a and 601b of each pair. It is also possible to mount the second externally-toothed gear 612 on the left end of the eccentric cylindrical roller 610. Each eccentric cylindrical roller 610 is provided with a pair of eccentric portions 613a and 613b which are arranged side-by-side in the axial direction. Bearings 614 are disposed between the eccentric portions 613a, 613b and the pin-receiving bores 604 in the externally-toothed gears 601a, 601b. The internally-toothed gear 602 is clamped at its both sides by a pair of rotary covers 616, 617 which in cooperation serve as a rotary casing, and is fastened to the rotary covers 616, 617 by means of a plurality of bolt and nut assemblies (not shown). It will be understood that the eccentric roller 610 can be substituted by the intermediate input shaft having eccentric portions as shown in FIG. 5.

The inscribe type planetary gear mechanism 600 operates such that the internally-toothed gear 602 serving as an output member rotates in the same direction as the direction of rotation of the eccentric cylindrical roller 610.

The inscribe type planetary gear mechanism 600 is the same as that used in known trochoidal planetary reduction gears. The planetary reduction gear of the sixth embodiment of the present invention employs this inscribe type planetary gear mechanism in combination with a planetary gear mechanism generally denoted by reference numeral 630.

The planetary gear mechanism 630 has an input shaft 631 which is rotatably supported by a bearing mounted on a stationary flange 608 and a bearing 633 mounted on a rotary cover 616. The above-mentioned eccentric cylindrical roller 610 is arranged to surround the input shaft 631 concentrically therewith. An externally-toothed sun gear 635 is formed integrally with the input shaft 631 at an end thereof. At the same time, a plurality of planet gears 636 are arranged at an equal circumferential pitch around the externally-toothed sun gear 636 in meshing engagement therewith. Each planet gear 636 is rotatably supported by a planet gear shaft 637. The planet gear shafts 637 are fixed to an externally-toothed planet carrier gear 638. The aforementioned externally-toothed gears 612 mesh with the external teeth of the planet carrier gear 638. The planet gears 636 inscribe in an internally-toothed sun gear 640 which is mounted on the rotary cover 616 so as to rotate together with the rotary cover 616 and the internally-toothed gear 602 which is connected to the rotary cover 616 and which serves as the output member.

In the planetary gear mechanism 630, the direction of the input rotation of the input shaft 631 and the direction of the output rotation of the planet carrier gear 638 are the same and, at the same time, a torque acts on the internally-toothed sun gear 640 in the direction opposite to the direction of the output rotation of the planetary carrier gear 638.

The operation of the planetary reduction gear of the sixth embodiment is as follows.

Referring to FIGS. 17 and 18, rotation of the externally-toothed sun gear 635 in the direction of the arrow $P_6$ is transmitted to the planet gears 636 so as to cause the latter to rotate in the direction of an arrow $P_7$. The rotation of the planet gears 636 in the direction of the arrow $P_7$ in one hand causes the internally-toothed sun gear 640 to rotate in the direction of the arrow $P_8$ and on the other hand causes the planet carrier gear 638 to rotate in the direction of the arrow $P_9$. The rotation of the planet carrier gear 638 in the direction of the arrow $P_9$ is transmitted through the second externally-toothed gears 612 to the eccentric cylindrical roller 610 having the eccentric portions 613a and 613b so as to cause the eccentric cylindrical roller 610 to rotate in the direction of an arrow $P_{10}$. The internally-toothed gear 602 is caused by the eccentric cylindrical roller 610 to rotate in the direction which is the same as the direction $P_8$ of rotation of the internally-toothed sun gear 640. Thus, the inscribe type planetary gear mechanism 600 operates such that the direction $P_8$ of rotation of the internally-toothed gear 602 as the output member is counter to the direction $P_9$ of rotation of the input member which is in this case the planet carrier gear 638. More specifically, the rotation of the planet carrier gear 638 is transmitted to the internally-toothed gear 602 through the second externally-toothed gears 612, eccentric rollers 610 and the externally-toothed gears 601a, 601b so as to cause the internally-toothed gear 602 to rotate in the direction reverse to the direction of rotation of the planet carrier gear 638. On the other hand, the planetary gear mechanism 630 operates such that the direction $P_9$ of the planet carrier gear 638 as the output member is the same as the direction $P_6$ of the input shaft 631 as the input member. More specifically, the rotation of the input shaft 631 is transmitted to the planet carrier gear 638 through the externally-toothed sun gear 635 and the planet gears 636 so as to rotate the planet carrier gear 638 in the same direction as the input shaft 631.

It is assumed here that an error has been caused in the rotation of the internally-toothed gear 602 serving as the output member.

Referring to FIGS. 17 and 18, if the rotational phase of the internally-toothed gear 602 has advanced from the correct phase by an amount +Q, the phase of the internally-toothed sun gear 640 fixed to and connected to the internally-toothed gear 602 also is advanced by the same amount +Q. In the planetary gear mechanism 630, the planet carrier gear 638 rotates in the same direction as the externally-toothed gear 635 so that the eccentric cylindrical roller 610 is rotationally pushed ahead by the amount +Q in the same direction as the rotation of the internally-toothed gear 602 through the second externally-toothed gears 612 which mesh with the planet carrier gear 638. On the other hand, in the inscribe type planetary gear mechanism 600, the direction of the input rotation and the direction of the output rotation are counter to each other, so that the planet carrier gear 638 is pushed by a rotational amount −Q, i.e., in the direction counter to the direction of rotation of the internally-toothed gear 602. In consequence, the fluctuation in the rotation of the internally-toothed gear 602 produces an effect which causes the rotational phase of the second externally-toothed gear 612, i.e., the eccentric roller 610, to be delayed by the amount represented by −Q.

As will be understood from the foregoing description, the transmission of rotation from the externally-toothed sun gear 635 to the planet gears 636 is conducted in a closed loop such that the rotation of the planet gears 636 is returned to the planet gear 636 through the planet carrier gear 638, second externally-toothed gears 612, eccentric portions 613a, 613b, externally-toothed gears 610a, 601b, internally-toothed gear 602, rotary cover 616 and the internally-toothed sun gear 640. In consequence, information is negatively fed back to the input side of the inscribe type planet gear mechanism 600 from the internally-toothed sun gear 640. Thus, the reduction gear itself has a function for cancelling the error +Q by −Q so as to compensate for a fluctuation in the control object, as in the case of electrical feedback adopted in a servo system. It will be understood that any error which appears to delay the rotational phase of the internally-toothed gear 602 is compensated for by the function which operates to advance the input side by the same principle as that described above.

The sixth embodiment described above produces the same advantages as those derived from the first embodiment explained in connection with FIGS. 5 to 8.

Figure 19:
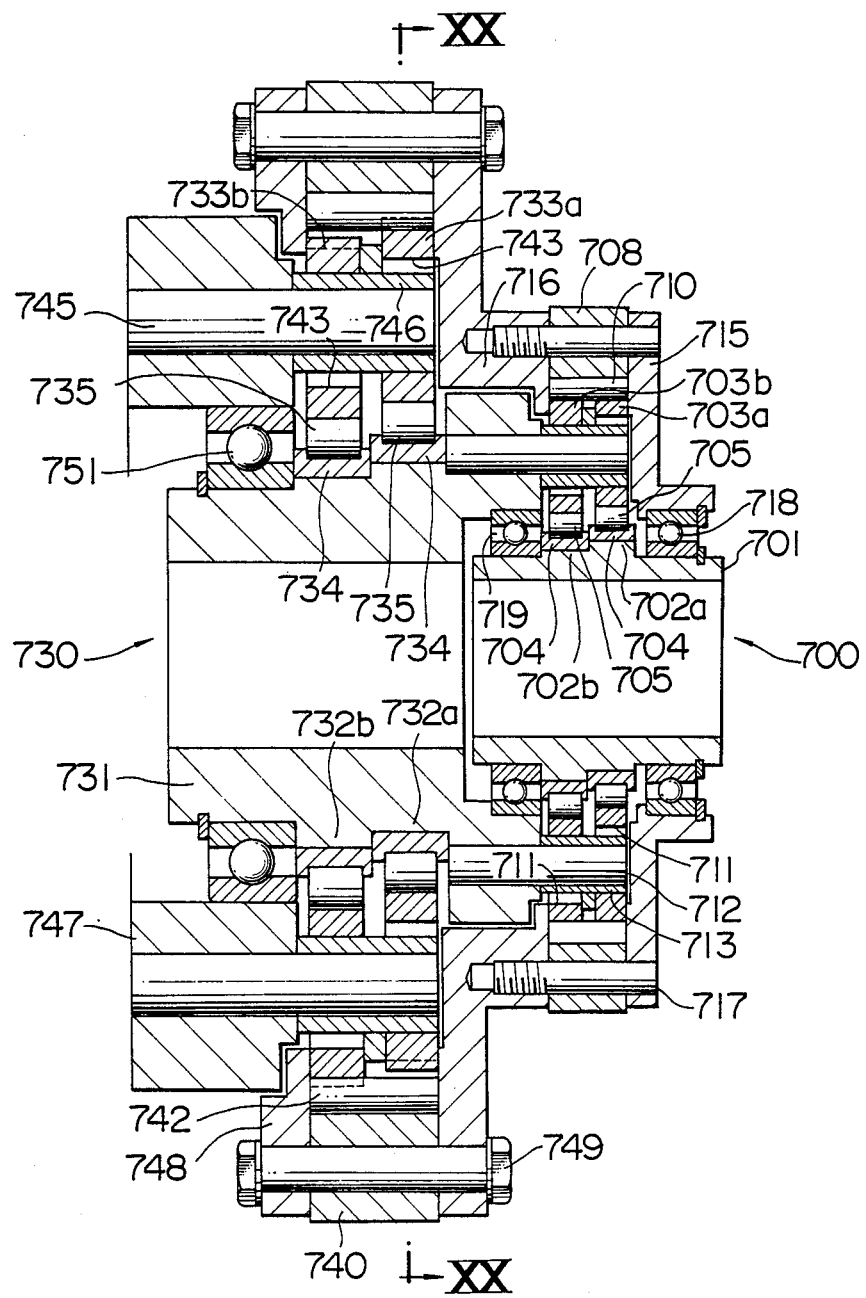
FIG. 19 is a longitudinal sectional view of a multi-staged gear as a reference.
Figure 20:
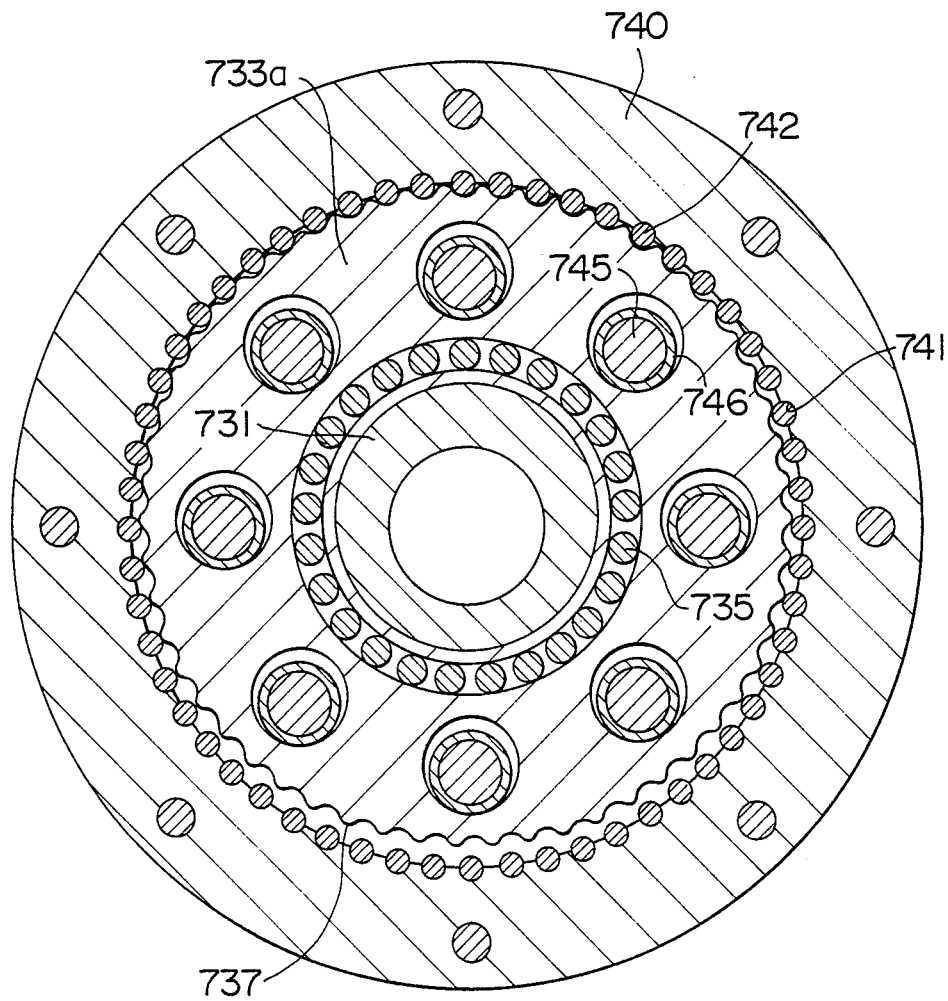
FIG. 20 is a sectional view taken along the line XX—XX of FIG. 19.
Figure 21:
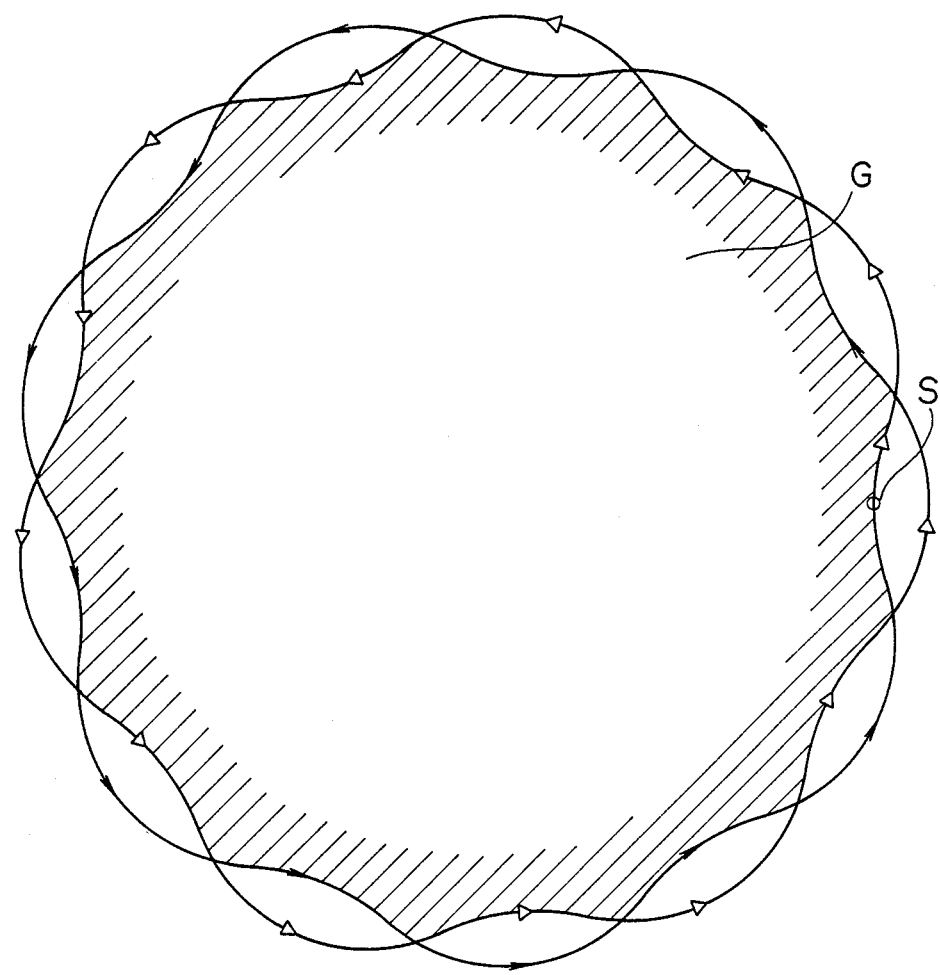
FIG. 21 is a view illustrative of the generation of the teeth on an externally-toothed gear shown in FIG. 19.

FIGS. 19 to 21 show a planetary reduction gear which is a reference example of the invention. This planetary reduction gear has a 1st stage planetary gear mechanism generally denoted by numeral 700. The 1st stage planetary gear mechanism 700 has a hollow intermediate input shaft 701 which rotatably receives an input shaft (not shown). The intermediate input shaft 701 integrally has a pair of eccentric portions 702a, 702b which are arranged side-by-side in the axial direction. A pair of ring-shaped externally-toothed gears 703a and 703b are rotatably carried by the eccentric portions 702a and 702b through a bearing ring 704 and rollers 705, respectively. The externally-toothed gears 703a and 703b are provided with trochoidal external teeth. The externally-toothed gears 703a and 703b inscribe an internally-toothed gear 708 which serves as a stationary member. More specifically, the internally-toothed gear 708 is provided in the inner peripheral surface thereof with a plurality of grooves which are equi-distantly spaced in the circumferential direction. These grooves receive outer pins 710 fixedly or rotatably. These outer pins 710 provide the arcuate teeth of the internally-toothed gear 708 which mesh with the external teeth of the externally-toothed gears 703a and 703b. These outer pins 710 may rotatably carry respective rollers. Each of the externally-toothed gears 703a and 703b is provided with a plurality of pin-receiving bores 711 which are equi-distantly spaced in the circumferential direction. The pin-receiving bores 711 in the externally-toothed gear 703a and the pin-receiving bores 711 in the externally-toothed gear 703b are axially aligned. Inner pins 712 are loosely received in the respective pairs of the axially-aligned pin-receiving bores 711. These inner pins 712 rotatably carry inner rollers 713. These inner pins 712 are held by a hollow second intermediate input shaft 731 which serves as the input member for the next stage. The internally-toothed gear 708 is clamped at its both sides by a pair of stationary covers 715 and 716 and are fixed to these stationary covers 715, 716 by means of a plurality of bolt and nut assemblies. The intermediate input shaft 701 is rotatably supported by a pair of bearings 718 and 719 which are axially spaced from each other. On 719 of these bearings is disposed between the intermediate input shaft 701 and the second intermediate input shaft 731, while the other 718 is interposed between the intermediate input shaft 701 and the stationary cover 715.

The planetary reduction gear shown in FIGS. 19 to 21 has a 2nd stage inscribe type planetary gear mechanism which is generally denoted by reference numeral 730. The 2nd stage planetary gear mechanism 730 has the above-mentioned second intermediate input shaft 731. The second intermediate input shaft 731 is integrally provided with a pair of eccentric portions 732a, 732b which are arranged side-by-side in the axial direction. A pair of annular externally-toothed gears 733a and 733b are rotatably carried by the eccentric portions 732a and 732b through a bearing ring 734 and rollers 735, respectively. Each of the externally-toothed gears 733a, 733b has trochoidal external teeth on the outer peripheral surface thereof The externally-toothed gears 733a and 733b inscribe in a ring-shaped internally-toothed gear 740 which serves as a stationary member. More specifically, the internally-toothed gear 740 is provided in the inner peripheral surface thereof with a plurality of grooves which are equi-distantly spaced in the circumferential direction. These grooves 741 receive outer pins fixedly or rotatably. These outer pins 742 provide arcuate teeth of the internally-toothed gear which engage with the external teeth 737 on the externally-toothed gears 733a and 733b. These outer pins 742 may rotatably carry outer rollers. Each of the externally-toothed gears 733a and 733b is provided with a plurality of, e.g., 8, pin-receiving bores 743 which are equi-distantly spaced in the circumferential direction. The pin-receiving bores 743 in the externally-toothed gear 733a and the pin-receiving bores 743 in the externally-toothed gear 733b are axially aligned. Inner pins 745 are loosely received in the pairs of axially-aligned pin-receiving bores 743. These inner pins 745 rotatably carry inner rollers 746. These inner pins 745 are held by an output flange 747 which serve as an output member. An output shaft (not shown) similar to the output shaft 14 as shown in FIG. 1 is integrally formed with the output flange 747 or integrally connected to the output flange 747. The internally-toothed gear 740 is clamped at its both sides by the aforementioned stationary covers 716 and 748 are is fixed to these stationary covers 716, 748 by means of a plurality of bolt and nut assemblies 749. The second intermediate input shaft 731 is rotatably supported by bearings 719 and 751. The bearing 751 is interposed between the second intermediate input shaft 731 and the output flange 741.

In this reduction gear having the 1st and 2nd stage inscribe type planetary gear mechanisms 700, 730, at least the output-side, i.e., the 2nd stage, planetary gear mechanism 730 is constructed such that the difference between the number of the teeth of the internally-toothed gear 740 and the number of teeth of each externally-toothed gears 733a, 733b is not smaller than 2.

FIG. 20 illustrates the state of meshing between the externally-toothed gear 733a (733b) and the outer pins 742 attained when the above-mentioned difference in the number of teeth is 2. In the illustrated reference example, the reduction ratio is 1/27.

A description will be given hereafter of the generation of external gear teeth which is to be adopted when the difference in the number of teeth is 2 or greater. The externally-toothed gear 733a, 733b is generated such that a rolling circle (not shown) placed on a basic circle (not shown) returns to the starting position S after making M revolutions (M being an integer which is 2 in the illustrated reference example). Alternately, the teeth of these externally-toothed gears 733a, 733b is formed by superposing a plurality of externally-toothed gears having trochoidal teeth such that these gears are circumferentially offset by a predetermined amount which is ½ when two gears are used, and forming teeth in conformity with the overlapping portions of teeth of these gears. In FIG. 21, the portions for providing the externally-toothed gears 733a and 733b are shown by hatched area G.

The inscribe type internally-toothed gear mechanism 730 with trochoidal teeth and having the above-mentioned teeth number difference M (M being an integer not smaller than 2) can transmit a large torque because of the large number of effectively meshing teeth, so that this type of mechanism well meets the demands for smaller size and higher rigidity. Unfortunately, however, the reduction ratio is small as compared with the mechanism in which the above-mentioned difference in the teeth number is 1. When the difference in the number of teeth is 2, the reduction ratio preferably ranges between 1/5 and 1/50.

In the described reference example, high rigidity and reduced size and weight are simultaneously attained in the stage in which the above-mentioned difference in the number of teeth is not smaller than 2. In addition, the reduction gear as a unit provides a large reduction ratio because of the combination of the two stages of planetary gear mechanism. In addition, it is possible to transmit a large torque because the inscribe type planetary gear mechanism 730 which has the above-mentioned teeth difference number not smaller than 2 is used as the final stage of the reduction gear. In general, the overall weight of a multi-stage reduction gear is ruled chiefly by the weight of the final stage, and reduction mechanisms on the input side of the final stages are required only to transmit comparatively small torque, which is as small as 1/final stage reduction ratio of the torque to be borne by the final stage. The reduction mechanisms other than the final stage, therefore, may be small and light-weight, so that the advantage of reduction in the weight is never impaired.

Figure 22:
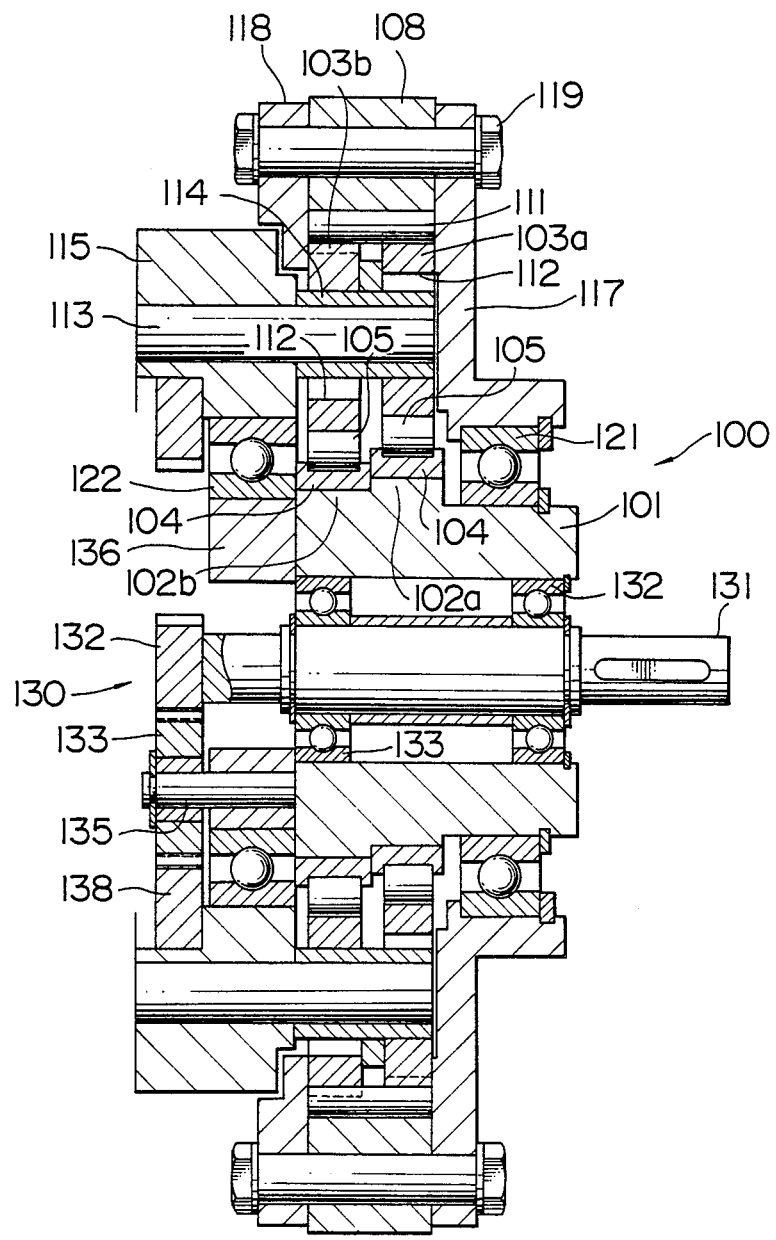
FIG. 22 is a longitudinal sectional view of a seventh embodiment of the present invention in which the art of the reference shown in FIG. 19 is applied to the planetary reduction gear shown in FIG. 5.

FIG. 22 illustrates a planetary gear mechanism in accordance with a seventh embodiment of the present invention. The seventh embodiment is accomplished by adopting, in the first embodiment shown in FIGS. 5 to 8, the technical idea relating to the difference in the teeth number as explained in connection with the reference example shown in FIGS. 19 to 21.

Namely, the 2nd stage inscribe type planetary gear mechanism 100 is so constructed that the difference between the number of the outer pins 111 on the internally-toothed gear 108 and the number of external teeth on each of the externally-toothed gears 103a, 103b is not smaller than 2. Other portions of the construction and the manner of operation of this embodiment are materially the same as those of the first embodiment. In FIG. 22, therefore, the same reference numerals are used to denote the same parts or members as those appearing in FIG. 5, and description of such parts or members is omitted. This seventh embodiment offers the advantage of the reference example shown in FIGS. 19 to 21, besides the advantage produced by the first embodiment.

Figure 3:
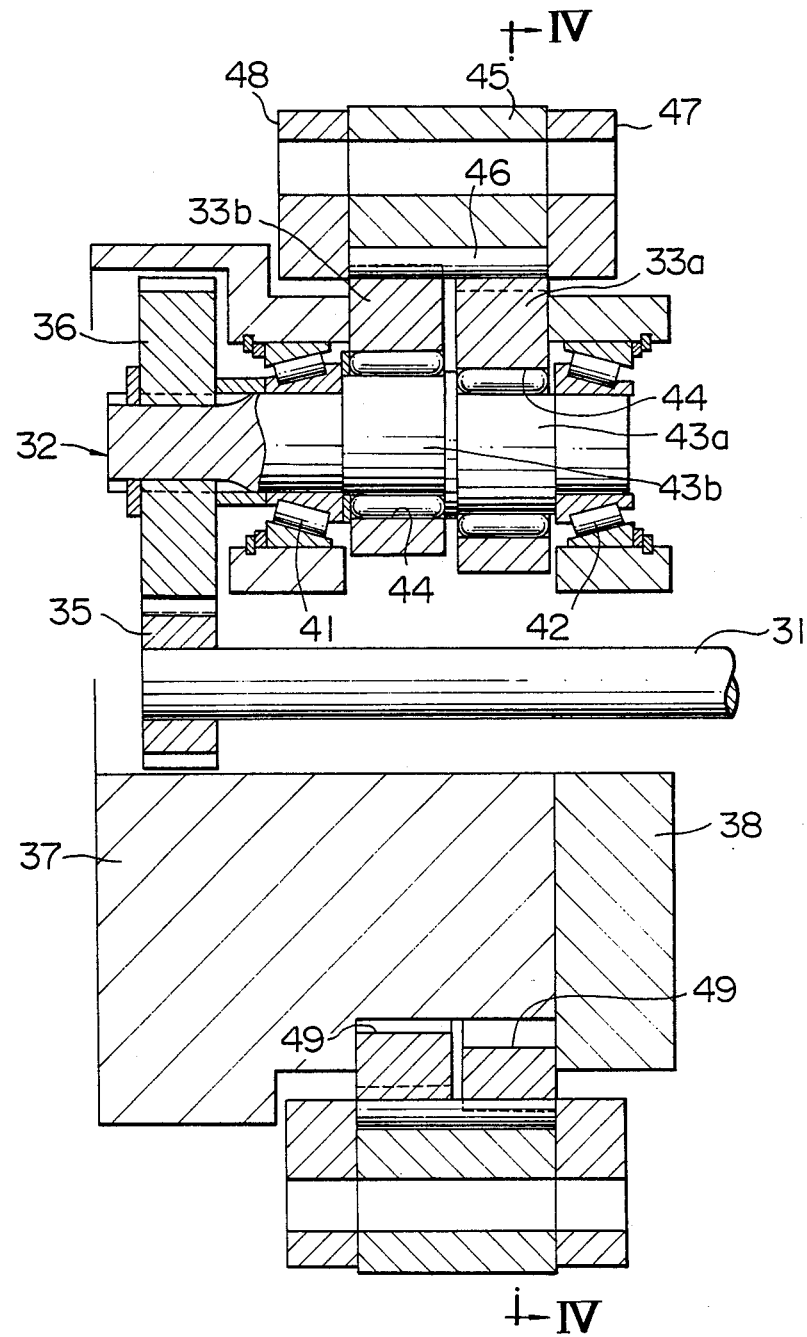
FIG. 3 is a longitudinal sectional view of another known inscribe type planetary reduction gear.
Figure 4:
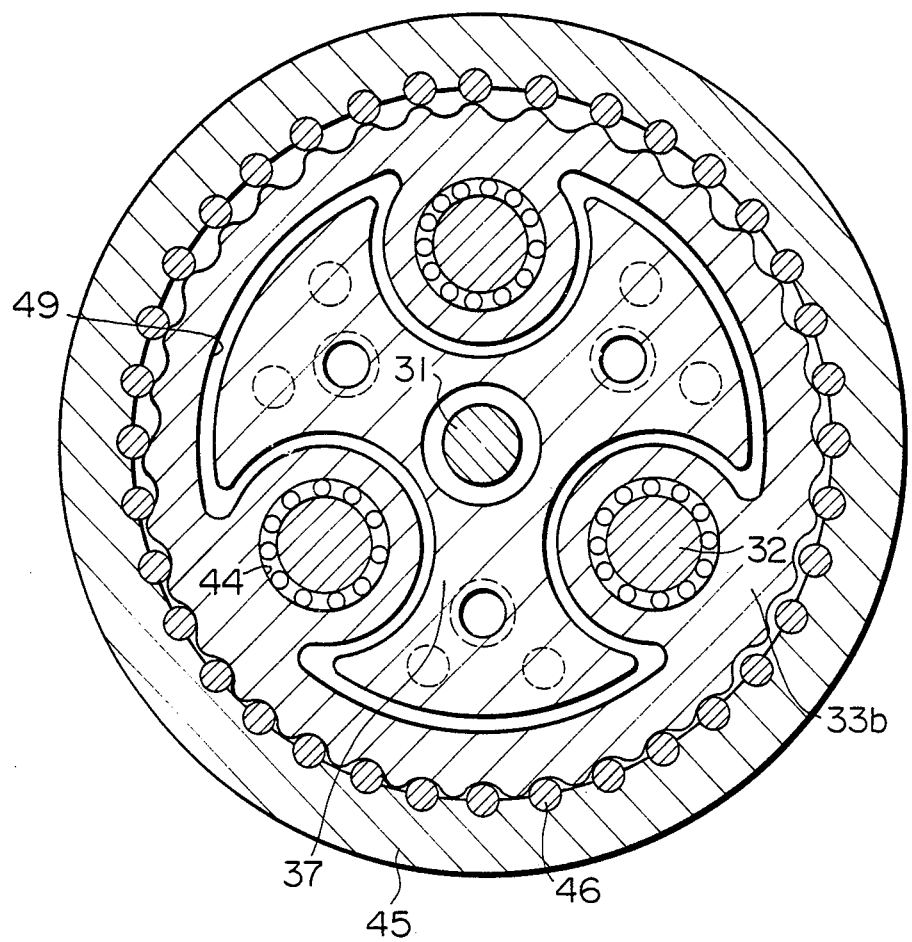
FIG. 4 is a sectional view taken along the line IV—IV of FIG. 3.
Figure 23:
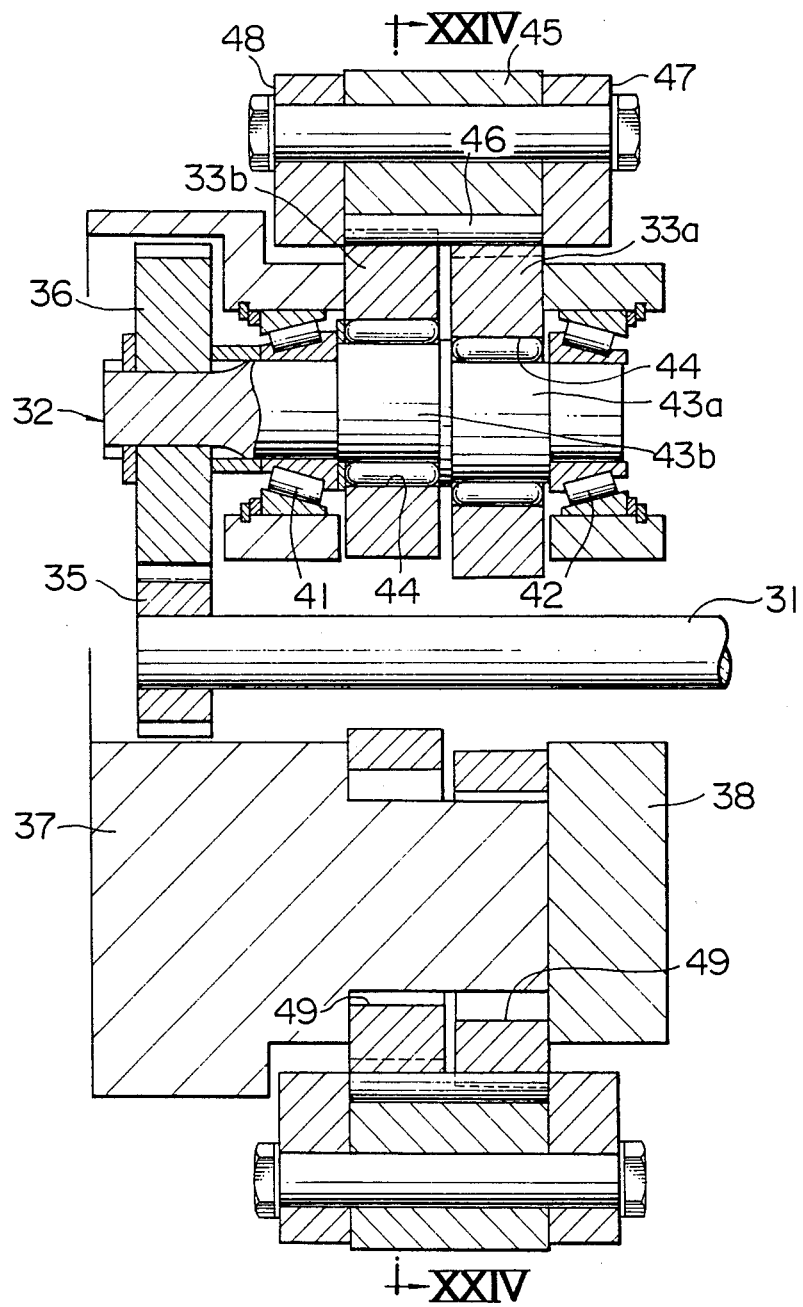
FIG. 23 is a longitudinal sectional view of a second reference which is obtained by applying the reference of FIG. 19 to the known reduction gear shown in FIG. 3.
Figure 24:
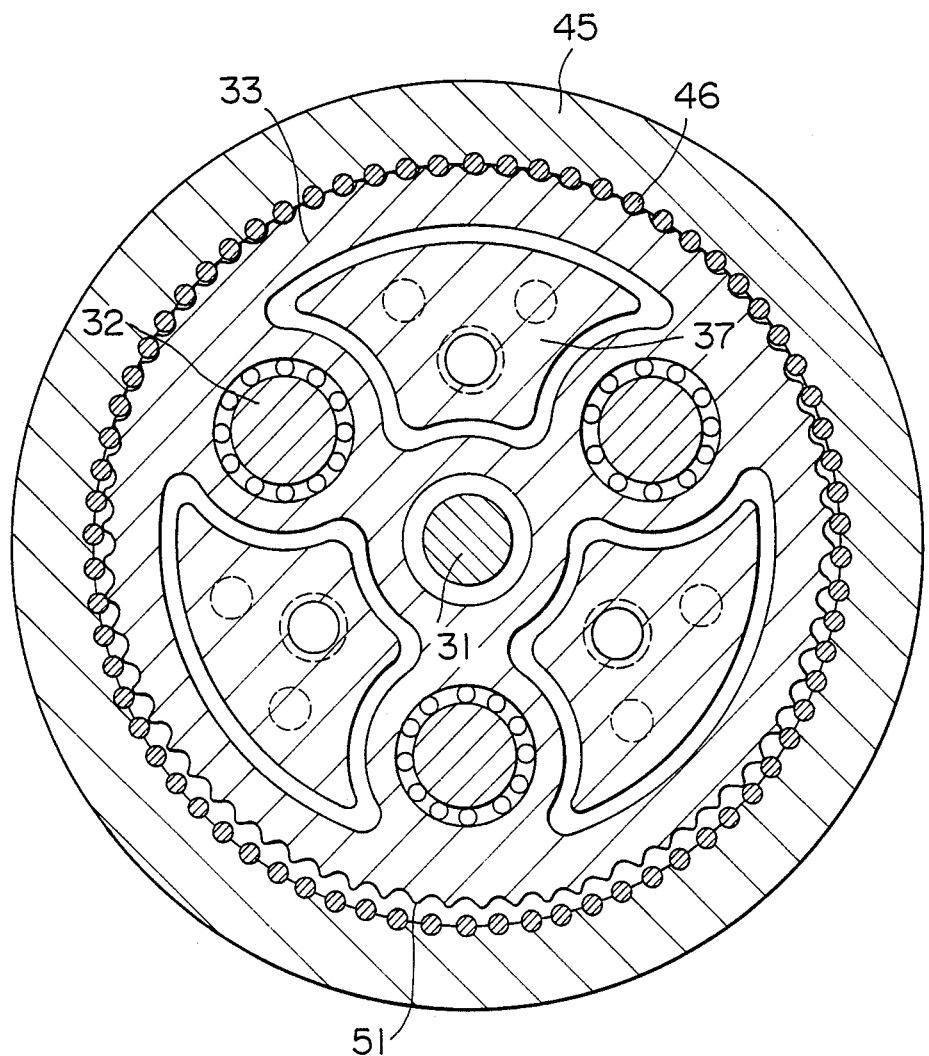
FIG. 24 is a sectional view taken along the line XXIV—XXIV of FIG. 23.

FIGS. 23 and 24 show a second reference example of the present invention. This second reference example incorporates the technical idea concerning the difference in the teeth number explained in connection with FIGS. 19 to 21, in combination with the known inscribe type planetary gear mechanism of FIGS. 3 and 4. More specifically, the second reference example is constructed such that the difference between the number of the outer pins 46 on the internally-toothed gear 45 and the number of the external teeth 51 of the externally-toothed gears 33a, 33b is not smaller than 2. Other portions of the construction and the manner of operation of this second reference example are the same as those of the known reduction gear shown in FIGS. 3 and 4. Therefore, in FIGS. 23 and 24, the same reference numerals are used to denote the same parts or members as those appearing in FIGS. 3 and 4 and detailed description of such parts or members is omitted. This second reference example produces the same advantages as those derived from the reference example explained in connection with FIGS. 19 to 21.

The technical idea concerning the difference in the teeth number explained in connection with FIGS. 19 to 21 may be applied also to reduction gears which have three or more speed reduction stages. In such a case, the arrangement may be such that at least one of these stages has inscribe type planetary gear mechanism constructed such that the difference between the number of the outer pins on the internally-toothed gear and the number of teeth of the externally-toothed gears is not smaller than 2.

Industrial Applicability

The planetary reduction gear in accordance with the present invention can be used in various control systems for controlling driving of movable members such as an arm of an industrial robot.

We claim:

1. A planetary reduction gear having an inscribe type planetary gear mechanism comprising a ring-shaped internally-toothed gear (108; 602), externally-toothed gear means (103a, 103b; 601a, 601b) which inscribe in said internally-toothed gear, a plurality of pin-receiving bores (112; 604) provided in said externally-toothed gear means and spaced in the circumferential direction, inner pins (113; 606) loosely received in the pin-receiving bores, a flange (115, 608) supporting said inner pins, and rotatable eccentric means (102a, 102b; 613a, 613b) for causing eccentric rotation of said externally-toothed gear means in an orbiting manner,
characterized by comprising a planetary gear mechanism (130; 630) combined with said inscribe type planetary gear mechanism, said planetary gear mechanism (130; 630) including an input shaft (131; 631), an externally-toothed sun gear (132; 635) secured to said input shaft for rotation therewith, a plurality of planet gears (133; 636) arranged around said sun gear in meshing engagement therewith, an internally-toothed sun gear (138; 640) in which said planet gears inscribe, and a rotatable planet carrier (136; 638) rotatably carrying said planet gears and connected to said eccentric means so as to rotate said eccentric means;
wherein one of said internally-toothed gear and said flange serves as an output member while the other serve as a stationary member;
and wherein said internally-toothed sun gear being secured to said output member for rotation therewith;
whereby the rotation of said input shaft is transmitted to said planet carrier through said externally-toothed sun gear and said planet gears so as to cause said planet carrier to rotate in the same direction as the direction of rotation of said input shaft; and
the rotation of said planet carrier is transmitted to said output member through said eccentric means and said externally-toothed gear means so as to cause said output member to rotate in the direction counter to the direction of rotation of said planet carrier.

2. A planetary reduction gear according to claim 1, wherein said output member includes said flange (115) while said stationary member includes said internally-toothed gear (108).

3. A planetary reduction gear according to claim 2, wherein said inscribe type planetary gear mechanism includes an intermediate input shaft (101) on which said eccentric means (102a, 102b) are mounted for rotation as a unit therewith, said planet carrier (136) being connected to said intermediate input shaft for rotation as a unit therewith.

4. A planetary reduction gear according to claim 2 or 3, wherein said intermediate input shaft (101) is hollow and supported by said input shaft for relative rotation with respect to said input shaft and concentric with said input shaft.

5. A planetary reduction gear according to claims 2 or 3, wherein said flange (115) has an annular recess (241; 441) which receives said internally-toothed sun gear (138), and wherein said flange and said internally-toothed sun gear are fixed to each other through fixing means (243; 342; 444; 544).

6. A planetary reduction gear according to claim 5, wherein said internally-toothed sun gear (138) is provided with an annular projection (242) projecting from outer peripheral portion of an end surface thereof, and wherein said fixing means includes screws (243) which are extended radially through said annular projection of said internally-toothed sun gear so as to be screwed into a peripheral wall of said recess (241).

7. A planetary reduction gear according to claim 5, wherein said fixing means includes a knurled portion (341) provided on an outer peripheral surface of said internally-toothed sun gear (138) and said internally-toothed sun gear is press-fit into said recess such that said knurled portion frictionally engages with a peripheral surface of said recess.

8. A planetary reduction gear according to claim 5, wherein a peripheral wall surface of said recess (441) in said flange (115) has a plurality of axial grooves (442) of a substantially semi-circular cross-section and spaced equi-distantly in a circumferential direction, while an outer peripheral surface of said internally-toothed sun gear (138) has a plurality of axial grooves (443) having a semi-circular cross-section and equi-distantly spaced in the circumferential direction, said axial grooves formed in the peripheral wall surface of said recess and said axial grooves formed in the outer peripheral surface of said internally-toothed sun gear cooperate in defining a plurality of split holes, and wherein said fixing means includes a plurality of screws (444) screwed into said split holes.

9. A planetary reduction gear according to claim 1, wherein said output member includes said internally-toothed gear (602) while said stationary member includes said flange (608), said internally-toothed gear being connected through a rotary casing (616) to said internally-toothed sun gear (640) for rotation as a unit therewith.

10. A planetary reduction gear according to claim 9, wherein said inscribe type planetary gear mechanism (630) includes second externally-toothed gear means (612) mounted on said eccentric means (613a, 613b) for rotation as a unit therewith, and wherein said planet carrier includes a planet carrier gear (638) which meshes with said second externally-toothed gear means.

11. A planetary reduction gear according to claim 10, wherein said eccentric means includes a plurality of eccentric members (610) which are rotatably carried by said inner pins (606) and wherein said second externally-toothed gear means includes a plurality of externally-toothed gears (612) which are provided integrally with said eccentric members.

12. A planetary reduction gear according to claim 1, wherein the difference between the number of teeth of said internally-toothed gear (108) and the number of teeth of each externally-toothed gear (103a, 103b) in said inscribe type planetary gear mechanism is not smaller than 2.

* * * * *